United States Patent
Nakayama et al.

(10) Patent No.: US 7,136,132 B2
(45) Date of Patent: *Nov. 14, 2006

(54) LIQUID CRYSTAL DISPLAY DEVICE AND MANUFACTURING METHOD THEREFOR

(75) Inventors: Akio Nakayama, Kikuchi-gun (JP); Shingo Nagano, Kikuchi-gun (JP); Masaya Mizunuma, Kikuchi-gun (JP); Kazuhiro Kobayashi, Kikuchi-gun (JP); Hitoshi Koyama, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/057,952

(22) Filed: Jan. 29, 2002

(65) Prior Publication Data
US 2002/0105614 A1    Aug. 8, 2002

(30) Foreign Application Priority Data
Feb. 6, 2001   (JP) .............................. 2001-028982
Jul. 30, 2001  (JP) .............................. 2001-229099

(51) Int. Cl.
G02F 1/1343    (2006.01)

(52) U.S. Cl. .................. 349/147; 349/111; 349/129; 349/114

(58) Field of Classification Search ................ 349/187, 349/147, 129, 111, 114
See application file for complete search history.

(56) References Cited

U.S. PATENT DOCUMENTS

| | | | | |
|---|---|---|---|---|
| 5,541,753 A | * | 7/1996 | Raynes et al. | 349/200 |
| 5,680,190 A | * | 10/1997 | Michibayashi et al. | 349/140 |
| 5,691,782 A | * | 11/1997 | Nishikawa et al. | 349/47 |
| 5,777,700 A | * | 7/1998 | Kaneko et al. | 349/39 |
| 5,790,213 A | * | 8/1998 | Sasaki et al. | 349/48 |
| 5,841,490 A | * | 11/1998 | Matsuo | 349/40 |
| 6,104,461 A | * | 8/2000 | Zhang et al. | 349/122 |
| 6,177,919 B1 | * | 1/2001 | Numao | 345/94 |
| 6,198,516 B1 | * | 3/2001 | Kim et al. | 349/39 |
| 6,215,542 B1 | * | 4/2001 | Lee et al. | 349/143 |
| 6,249,325 B1 | * | 6/2001 | Ohkawara et al. | 349/38 |
| 6,307,611 B1 | * | 10/2001 | Kim et al. | 349/138 |
| 6,320,204 B1 | * | 11/2001 | Hirabayashi et al. | 257/71 |
| 6,335,771 B1 | * | 1/2002 | Hiraishi | 349/42 |
| 6,423,385 B1 | * | 7/2002 | Kagawa et al. | 428/1.1 |
| 6,461,694 B1 | * | 10/2002 | Nishikawa et al. | 428/1.3 |
| 6,912,034 B1 | * | 6/2005 | Nagano et al. | 349/144 |
| 2001/0019392 A1 | * | 9/2001 | Sakamoto et al. | 349/139 |
| 2002/0109652 A1 | * | 8/2002 | Lim et al. | 345/87 |

FOREIGN PATENT DOCUMENTS

KR    10-0268305    7/2000

* cited by examiner

Primary Examiner—James Dudek
Assistant Examiner—David Y. Chung
(74) Attorney, Agent, or Firm—Oblon, Spivak, McClelland, Maier & Neustadt, P.C.

(57) ABSTRACT

A liquid crystal display device having transistors disposed at the intersections of gate lines and source lines, pixel electrodes connected with the transistors, opposite electrodes opposite to these pixel electrodes, and liquid crystal held between said opposite electrodes and said pixel electrodes is disclosed. The pixel electrodes comprise a first pixel electrode and a second pixel electrode. The second pixel electrode are disposed in a layer above an insulating layer which is itself disposed in a layer above the first pixel electrode. The second pixel electrode has a region that does not overlap with the first pixel electrode. The second pixel electrode are electrically connected with the first pixel electrode.

14 Claims, 18 Drawing Sheets

(a) Thickness of insulating film established between the first layer and the second layer of pixel electrode [nm]

(b) Area of region with the first layer pixel electrode / Area of region with opening portion of the pixcel × 100(%)

(a) Region A with insulating film removed (b) Region B where insulating film remains (c) Sum

LIQUID CRYSTAL DISPLAY DEVICE AND MANUFACTURING METHOD THEREFOR

BACKGROUND OF THE INVENTION

1. Field of the Invention

The present invention relates to a matrix-type liquid crystal display device, and is more particularly associated with technology relating to the viewing angle characteristics of this liquid crystal display device.

2. Description of the Related Art

A matrix-type display device such as a liquid crystal display device usually comprises two substrates: a thin film transistor array substrate (hereinafter "TFT array substrate") whereon thin film transistors (hereinafter "TFTs") and so forth are established, and an opposite substrate whereon a color filter, black matrix, and so forth are established, with a display material such as liquid crystal held between those substrates. Image display is realized by selectively applying voltage to this display material.

FIG. 17 shows an equivalent circuit for a TFT array substrate. As shown in FIG. 17, the pixels are arranged in a matrix. In FIG. 17, G1, G2, and G3 are scanning signal lines (hereinafter "gate lines"). S1, S2, and S3 are picture signal lines (hereinafter "source lines") Cs1, Cs2, and Cs3 are storage capacitive electrode lines (hereinafter "Cs lines") for stabilizing the potential of the pixel electrodes during the holding period. 111 through 133 are TFTs. These TFTs function as switching elements and control the charging and discharging of charge to the pixel electrodes. 211 through 233 are storage capacitors (hereinafter "Cs capacitors") and are created by forming an insulating film between the pixel electrodes and Cs lines. The pixel electrodes are formed with transparent electrodes such as ITO (Indium tin oxide) 311 through 333 are liquid crystal capacitors Clc formed between the opposite substrate and liquid crystal.

Turning the TFT ON and OFF is controlled by applying voltage pulses to the gate lines connected to the gate electrodes of the TFTs. The pixel electrodes are connected with the source lines through the TFTs. The amount of charge in the pixel electrodes varies according to the signal level in the source lines and the potential of the pixel electrodes is established. The displacement amount of the liquid crystal changes according to the voltage across the pixel electrodes and opposite electrodes and changes the quantity of light transmitted from the back surface. Consequently, the optical signal change is controlled and the image is displayed by controlling the signal level of the source lines.

In order to improve image quality, it is necessary to reduce as much as possible the variation of pixel potential due to the change in signal level of the gate lines and so forth. For this reason, the Cs capacitors 211 through 233 are established on the pixel electrodes and provide a large total capacitance for the pixel. The Cs capacitors are formed by establishing an insulating film between the Cs lines, at the same potential as the opposite electrodes, and the pixel electrodes.

Next, FIG. 18 shows the pixel layout in a conventional TFT array substrate. FIG. 19 shows a cross sectional view of the pixel in FIG. 18 at the line A–A'.

In FIG. 18, 2 shows a gate line, 4 shows a semiconductor thin film, 7 shows a source line, 8 shows a source electrode, 9 shows a drain electrode, 11 shows a Cs line, and 14 shows a pixel electrode. In FIG. 19, 1 shows the glass substrate, 2 shows the TFT gate line, 3 shows the gate insulating film, 4 shows the semiconductor thin film, 8 shows the source electrode, 9 shows the drain electrode, 11 shows the Cs line, 14 shows the pixel electrode, and 103 shows the insulating film.

The manufacturing method for a conventional TFT array substrate is explained using FIG. 19. First, a metal film to become the gate electrode is formed on the glass substrate 1, a resist pattern is developed, and the gate electrode 2 is formed. After the resist is removed, as shown in FIG. 19, the gate insulating film 3 and the semiconductor thin film 4, comprising an i layer and n layer, are formed from the bottom, a resist pattern is developed, and the semiconductor thin film 4 is etched. After the resist is removed, an ITO thin film, to become the pixel electrode, is formed, the resist is developed, and the ITO film is etched, whereby the pixel electrode 14 is formed. After the resist is removed, a metal film is formed, a resist pattern is developed, and the source electrode 8 and drain electrode 9 are formed by etching. Furthermore, all of the n layer and part of the i layer on the TFT back channel side are etched (back channel etching) and the insulating film 103 is formed.

The manufacture and functions of a conventional TFT are explained next using an example. In the case of charging charge to the pixel electrode 14 in the TFT shown in FIG. 18, positive voltage of about 9 V is applied to the source electrode 8 and positive voltage of around 20 V is applied to the gate electrode 2. The TFT is thereby turned on and the drain electrode 9 and pixel electrode 14 are charged to about 9 V. Thereafter, when the potential of the pixel electrode increases sufficiently, negative voltage of about −5 V is applied to the gate electrode 2, the TFT is turned off, and the charge is confined in the pixel.

However, in addition to the TN (twisted nematic) type, various operating modes are used for the operating modes of a liquid crystal display element, for example, the IPS (in plane switching) type, VA (vertical alignment) type, and so forth for widening the viewing angle. FIG. 20 shows the relationship (V-T characteristics) of the voltage applied to the liquid crystal and the transmittance in the normally white (black display on a white background) mode for a TN-type liquid crystal display element. As shown in FIG. 20, there is a difference of about 1 to 2 V, for example, between the voltage at the start of the change in transmittance (threshold voltage Vth) and the voltage when the transmittance change has almost ended (saturated voltage Vsat). In an active matrix-type liquid crystal display element using a TFT as a switching element, a tonal display is made by establishing a number of voltage levels between this Vth and Vsat.

In a TN-type liquid crystal display element, there is a large change in transmittance when changing viewing angle based on the operating principles, and the narrow range of the viewing angle is a problem. The conventional art for improving this problem is discussed in detail next using the drawings.

A proposed technology is to establish a range where the electrical field intensity applied to the liquid crystal varies while the same voltage is applied across the pixel electrode and the opposite electrode, opposite thereto and holding the liquid crystal therebetween, in one pixel. In this conventional art, as shown in FIG. 19, the insulating film 103 is formed on the upper layer of the pixel electrode 14, and then a region A where the insulating film 103 is removed and a region B where the film remains are formed on the pixel electrode 14. Actually, because the alignment layer is formed on the TFT array substrate and the opposite substrate, an alignment layer is formed on the pixel region in FIG. 18. The voltage drop occurs in this portion of the alignment layer as well, but at a level that can be ignored, so there is no problem even if this alignment layer is omitted in the following explanation.

In the region A of the pixel electrode 14 from which the insulating film 103 is removed, voltage applied across the pixel electrode 14 and opposite electrode is applied to the liquid crystal. In the region B where the insulating film 103 remains, a voltage drop occurs in the portion with the insulating film and the voltage applied across the pixel electrode 14 and the opposite electrode is not applied without any change thereto. In other words, in the pixel electrode 14, the regions A and B, having mutually different characteristics of voltage applied across the electrodes to transmittance (V-T characteristics), are established within one pixel.

FIG. 20(*a*) shows the V-T characteristics curve of a pixel in the region A with the insulating film 103 removed. FIG. 20(*b*) shows the V-T characteristics curve occurring in the region B where the insulating film 103 remains. If each pixel is sufficiently small compared to the entire liquid crystal display device, the V-T characteristics curve is projected to an observer as shown in FIG. 20(*c*) which is the sum of the characteristics in FIG. 20(*a*) and (*b*). As a result, the difference between Vth and Vsat is substantially expanded.

With the expansion of the difference between Vth and Vsat, the narrowness of the viewing angle range during tonal display is also reduced. FIG. 21 shows the situation of the change of the V-T characteristics due to the viewing angle direction. FIG. 21(*a*) shows the case where there are no regions on the pixel electrode with different electrical field intensities applied. FIG. 21(*b*) shows the case where there is a region on the liquid crystal with part of the insulating film on the pixel electrode removed as shown in FIG. 18 and with different electric field strength applied.

In a liquid crystal display element with the TN-type operating mode, the relationship between the applied voltage and transmittance changes from the solid line to the dotted line because of changing the viewing angle direction. As a result, in the case where there are no regions on the pixel electrode with different electric field strength, the transmittance changes greatly with a change in the viewing angle direction as shown in FIG. 21(*a*). On the other hand, as shown in FIG. 21(*b*), in the case where there is a region with different electric field strength, the voltage shift width of the V-T characteristics, due to the change in the viewing angle direction when regions of different characteristics are seen as a single pixel, is about the same. As a result, the change in transmittance due to the viewing angle direction is small corresponding to the portion with a gentle change in transmittance due to the applied voltage and the viewing angle range becomes wide.

On the other hand, various methods are proposed as methods for expanding the viewing angle for liquid crystal display devices using the TN mode. For example, these include a method for expanding viewing angle by varying the array direction of the liquid crystal molecules in the pixels with a multidomain structure, in other words by varying the rising direction of the liquid crystal molecules when voltage is applied; and a method for expanding viewing angle by reducing the slope of the voltage-brightness characteristics by manufacturing the display so that different voltages are applied to the liquid crystal in a single pixel. Furthermore, there is a method for expanding the viewing angle as a result of suppressing the light leakage, in the black display state with voltage applied to the liquid crystal, by inserting an optical compensating film such as a retardation film between the liquid crystal and polarizing plate.

Gray-scale inversion in half tones gray is an issue for the viewing angle characteristics. In the TN mode, gray-scale inversions do not easily occur upwards and horizontally, but gray-scale inversions occur easily downwards. FIG. 22 shows the relationship between the vertical relative transmittance and angle in the case of applying voltage so that the relative transmittance is 100%, 75%, 50%, 25%, and black display at normal to the panel surface of a conventional TN mode liquid crystal display device. As clear from the drawing, when the half tone gray display is observed at about −20°, there is an intersection with the relative transmittance curves and it is understood that the display quality markedly deteriorates with the excessively dark image from downwards.

As discussed above, in order to expand the viewing angle range, it is necessary to create regions with different electric field strength applied to the liquid crystal in one pixel. In order to create such regions, it has been proposed to form a region with an insulating film removed and a region with that film remaining on the pixel electrode. In order to expand the viewing angle range, however, it is necessary to reduce the inclination of the characteristics curve of the total of a plurality of V-T characteristics and it is necessary to form a thick insulating film on and then to remove this thick insulating film from the same pixel electrode.

By employing this type of constitution, large steps are formed in the insulating film on the same pixel electrode. Consequently, even if an alignment layer is applied in the panel process, the steps cannot be filled in and large steps will be formed in the individual pixels of the liquid crystal display device. The side walls and bases of the steps become a cause of light leakage because they make it difficult to apply the alignment process by rubbing treatment or the like in the panel process and make it difficult for the liquid crystal to align in the desired direction even when voltage is applied. For this reason, a normally white type of liquid crystal display device has a structural problem such that, even if sufficient voltage is applied for the black display state, the brightness of the black state becomes high because of the light leakage and this brings about reduced contrast.

In recent years, the requirements for high contrast have been increasing more and more with the employment of liquid crystal display devices in television set displays. On the other hand, there are also problems of gray-scale inversion occurring in half tone grays.

SUMMARY OF THE INVENTION

In view of the foregoing, it is an object of the present invention to provide a liquid crystal display device with a wide viewing angle range, low black brightness, and high contrast.

It is another object of the present invention to eliminate light leakage due to the disorder in the orientation of the liquid crystal at step portions or near the base of step portions.

According to one aspect of the present invention, for achieving the above-mentioned object, there is provided a liquid crystal display device having transistors disposed at the intersections of gate lines and source lines, pixel electrodes connected with the transistors, opposite electrodes opposite to these pixel electrodes, and liquid crystal held between said opposite electrodes and said pixel electrodes, wherein the pixel electrodes comprise a first pixel electrode and a second pixel electrode disposed in a layer above an insulating layer which is itself disposed in a layer above the first pixel electrode, and having a region that does not overlap with the first pixel electrode and the first pixel electrode and second pixel electrode are electrically connected.

Consequently, it is possible to eliminate light leakage due to the disorder in the orientation of the liquid crystal at step portions or near the base of step portions.

According to another aspect of the present invention, there is provided a liquid crystal display device having transistors disposed at the intersections of gate lines and source lines, pixel electrodes connected with the drain electrodes of the transistors, opposite electrodes opposite to these pixel electrodes, and liquid crystal held between the opposite electrodes and the pixel electrodes, wherein the pixel electrodes comprise a first pixel electrode and a second pixel electrode disposed in a layer above an insulating layer which is itself disposed in a layer above the first pixel electrode, and having a region that does not overlap with the first pixel electrode, and the first pixel electrode and second pixel electrode are electrically connected with the drain electrode.

Consequently, it is possible to eliminate light leakage due to the disorder in the orientation of the liquid crystal at step portions or near the base of step portions.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

The preferred embodiments are explained for the present invention.

First Embodiment

Figure 1:
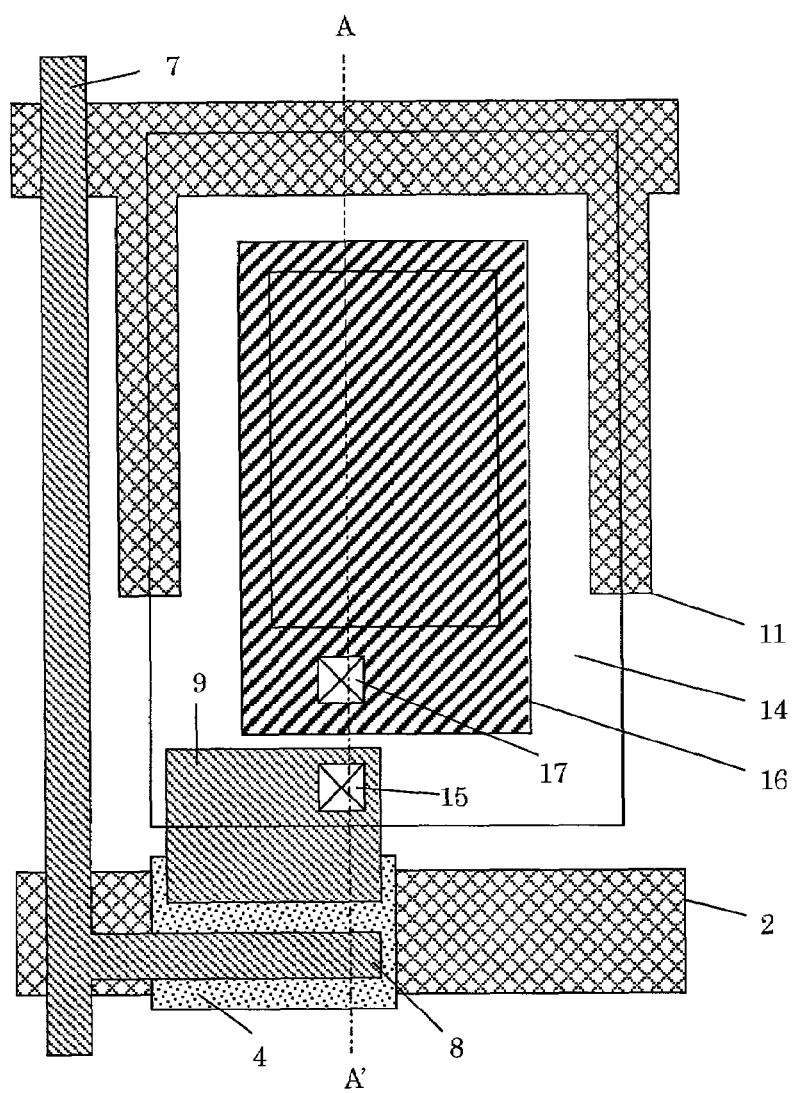
FIG. 1 shows a plan view of a pixel in a TFT array substrate.
Figure 2:
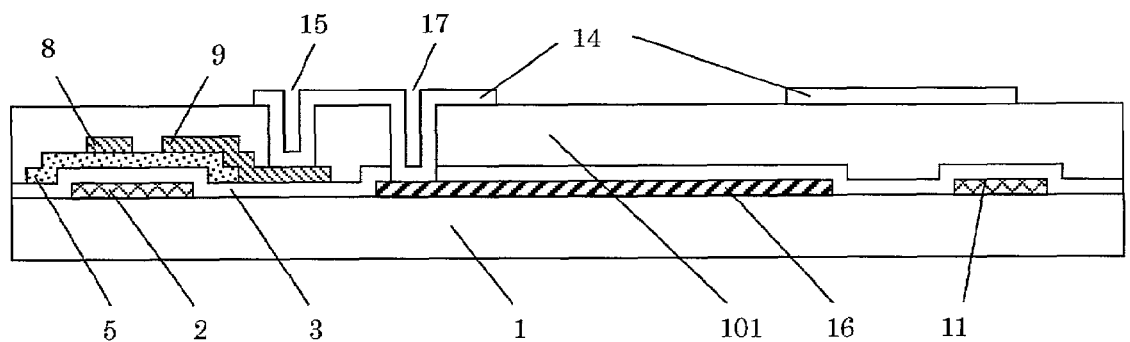
FIG. 2 shows a cross sectional view of the pixel in FIG. 1 taken at the line A–A'.
Figure 3:
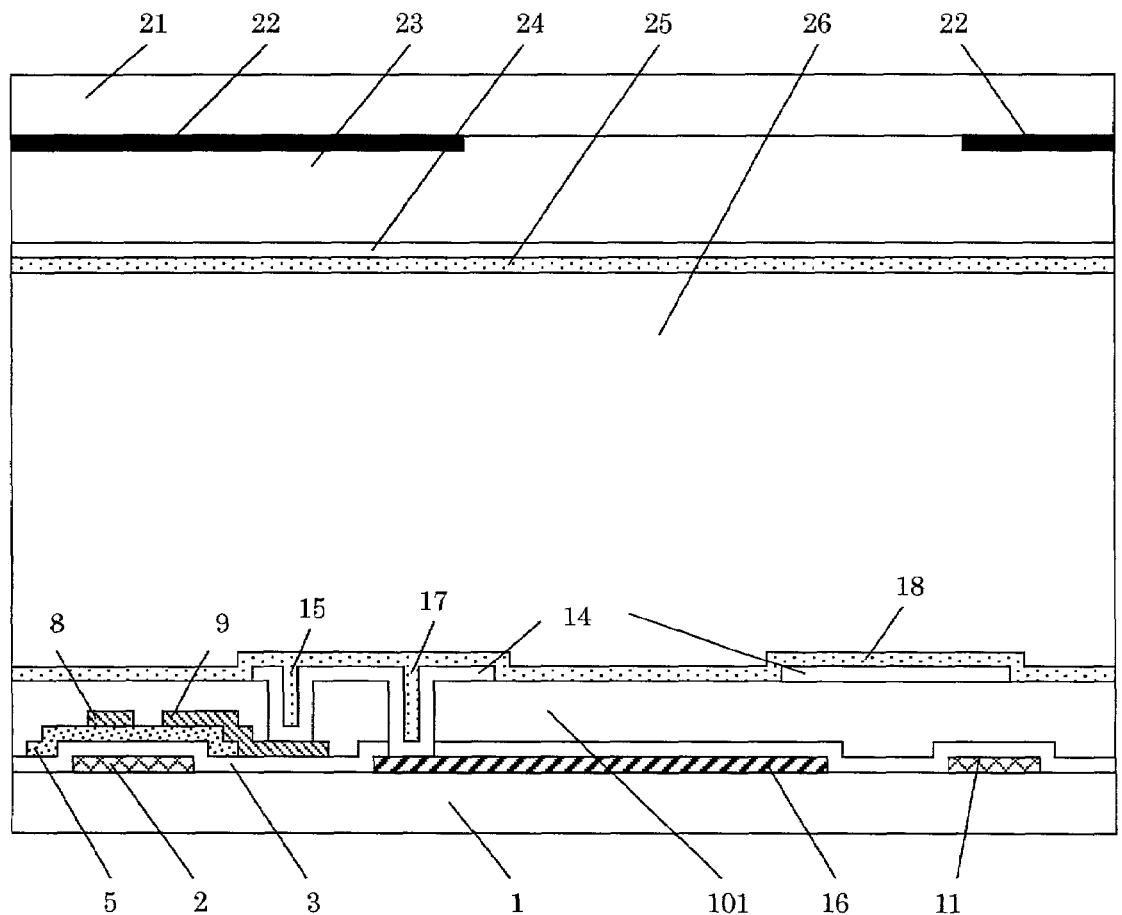
FIG. 3 shows a cross sectional, structural view of the display portion of the liquid crystal display device comprising a TFT array substrate, opposite substrate, and liquid crystal.

The active matrix-type liquid crystal display device relating to the first embodiment of the present invention is explained using FIGS. 1, 2, and 3. FIG. 1 shows a plan view of a pixel in a TFT array substrate. FIG. 2 shows a cross sectional view of the pixel in FIG. 1 taken at the line A–A'. FIG. 3 shows a cross sectional, structural view of the display portion of the liquid crystal display device comprising a TFT array substrate, opposite substrate, and liquid crystal.

In FIG. 1, 2 shows the gate line, 4 shows the semiconductor thin film, 7 shows the source line, 8 shows the source electrode, 9 shows the drain electrode, 11 shows the Cs line, 14 shows the pixel electrode comprising a second layer of ITO, 15 shows the contact of the drain electrode 9 with the pixel electrode 14, 16 shows the pixel electrode comprising a first layer of ITO, and 17 is the contact of the pixel electrode 16 comprising the first layer of ITO with the pixel electrode 14 comprising the second layer of ITO. Moreover, the contacts 15 and 17 are constituted by extending part of the pixel electrode 14.

In FIG. 2, 1 is the glass substrate, 3 is the gate insulating film, 5 is the semiconductor thin film, wherein the lower layer is a pure semiconductor layer (hereinafter "i layer") and the upper layer is an n layer having n-type impurities, and 101 is the interlayer insulating film. The constitution to which other symbols are applied is the same constitution, or corresponds to the constitution shown in FIG. 1, and an explanation thereof is therefore omitted.

In FIG. 3, 21 is the glass substrate, 22 is the shielding film, 23 is the coloring material of a color filter, 24 is the opposite substrate comprising a transparent conductive film such as ITO, 25 is the alignment layer, and 26 is the liquid crystal. As shown in FIGS. 1, 2, and 3, there are two pixel electrodes in the liquid crystal display device relating to the present embodiment: the pixel electrode 14 and pixel electrode 16. This pixel electrode 14 is disposed in a layer above the interlayer insulating film 101 which is disposed in a layer above the pixel electrode. Also, the pixel electrode 14 and pixel electrode 16 comprise a region without mutual overlap as seen from the opposite electrode. Furthermore, the pixel electrode 14 is electrically connected with the drain electrode 9 and is also electrically connected with the pixel electrode 16.

The method for manufacturing the liquid crystal display device is explained using these FIGS. 1, 2, and 3. First, the gate line 2 and Cs line 11 are formed by the formation of a metal film on the glass substrate 1 with sputtering, and then patterning with photolithography and etching that film. After that, the pixel electrode 16, comprising the first layer of ITO, is formed by the formation with sputtering and then the patterning of the ITO film. The gate insulating film 3 is then formed. Further, the TFT semiconductor thin film 5 is formed by the formation and patterning of a semiconductor thin film. The source line 7, source electrode 8, and drain electrode 9 are formed by the formation with sputtering and then patterning of a metal film. This TFT is formed by etching in this pattern formation process and removing the part of the n-type semiconductor layer and i layer where there is no metal wiring pattern.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the ITO.

As shown in FIG. 3, after the formation of the pixel electrode 14, the alignment layer 18 is applied over the pixel electrode 14 in the panel process. Meanwhile, the alignment layer 25 is applied on the opposite substrate side and the alignment layer 18 and 25 are made alignment treatment so that the liquid crystal is twisted about 90°. Then, a normally white mode liquid crystal display device is assembled, as shown in FIG. 3, by placing the liquid crystal 26 between the substrates, and applying one polarizing plate on each side opposite to the surface in contact with the liquid crystal of the upper and lower substrates, so that the absorption axes become about 90° relative to each other. In FIG. 3, because of the large step in the contact portion (Step due to the gate insulating film 3 and insulating film 101) in the contact portion 17 connecting the pixel electrode 14 and pixel electrode 16, it is sometimes the case that light leakage occurs because of the alignment treatment process not being performed satisfactorily due to rubbing or the like. In order to block that light leakage, the contact portion 17 is disposed at a location so as to overlap with the shielding film 22 on the glass substrate 21 on the opposite substrate side.

Preferably, the thickness of the ITO film in the pixel electrodes 14 and 16 should be small, selected from a range between about 30 to 150 nm, for example, while the thickness of the insulating film 101 should be sufficiently large (for example, selected from a range of 500 nm or greater), so that irregularities caused by the constituent parts on the pixel electrodes are minimized.

Second Embodiment

Figure 4:
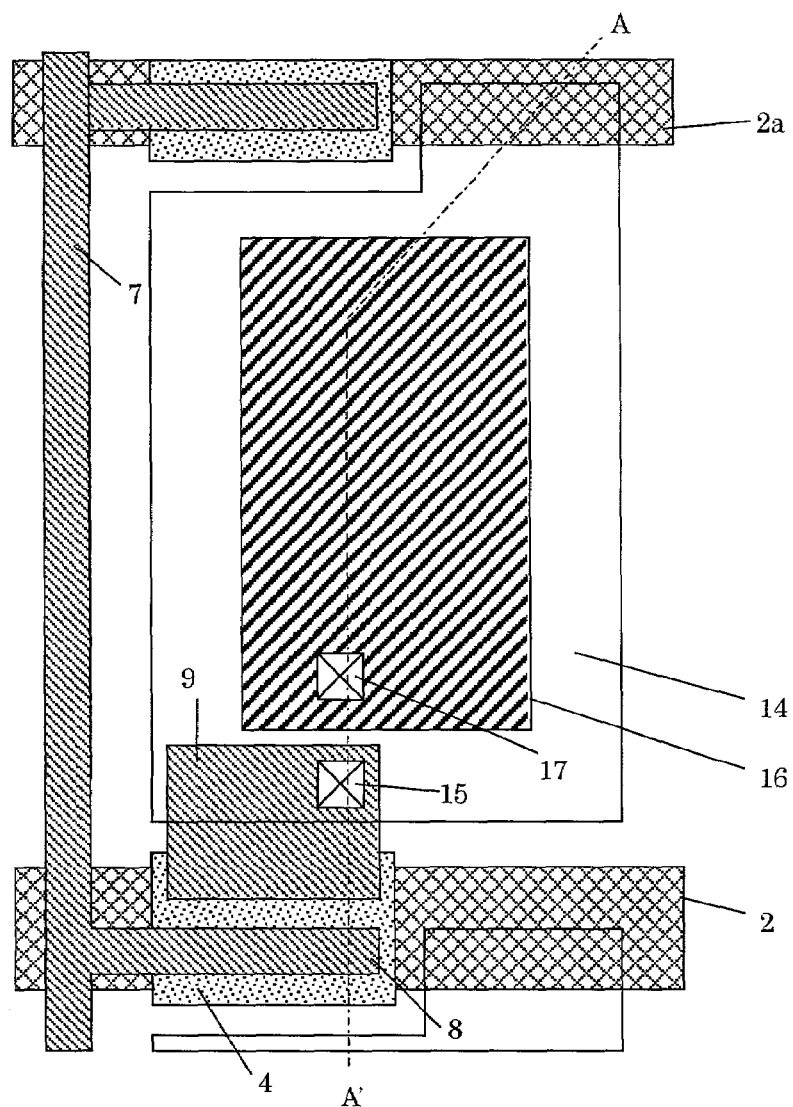
FIG. 4 is a plan view of a pixel in the TFT array substrate.
Figure 5:
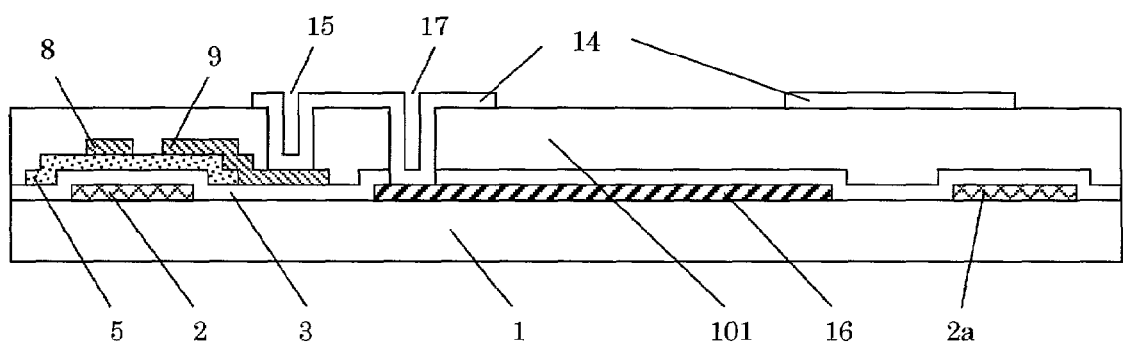
FIG. 5 is a cross sectional view of the pixel in FIG. 4 taken at the line A–A'.

The active matrix-type liquid crystal display device relating to the second embodiment of the present invention is explained using FIGS. 4 and 5. FIG. 4 is a plan view of a pixel in the TFT array substrate; and FIG. 5 is a cross sectional view of the pixel in FIG. 4 taken at the line A–A'. In FIGS. 4 and 5, elements of the constitution having the same symbols as in FIGS. 1 and 2 show identical portions or portions corresponding to the constitution in FIGS. 1 and 2 and an explanation thereof is omitted. In FIGS. 4 and 5, 2a is the adjacent gate line. In this second embodiment, the cumulative capacitance for stabilizing the pixel potential during the holding period is formed between the pixel electrode 14 and the adjacent preceding gate line 2a.

The method for manufacturing the liquid crystal display device relating to the second embodiment is explained next. The gate lines 2 and 2a are formed by the sputtering and formation of a metal film on the glass substrate 1, and then the patterning with photolithography and etching [of this film]. The pixel electrode 16 is then formed by the formation with sputtering and patterning of the ITO film. The gate insulating film 3 is then formed. The TFT semiconductor thin film 5 is formed by the formation and patterning of a semiconductor thin film. After that, the source line 7, source electrode 8, and drain electrode 9 are formed by the formation with sputtering and patterning of a metal film. The TFT is formed by the removal of the part of the n-type semiconductor layer and i layer where there is no metal wiring pattern by etching in the pattern formation process.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the ITO. The pixel electrode 14 is then patterned so that part thereof overlaps the adjacent gate line 2a and forms the storage capacitance in this overlapping portion.

Preferably, the thickness of the ITO film that is the pixel electrodes 14 and 16 should be small, selected from a range between about 30 to about 150 nm, for example, while the thickness of the insulating film 101 should be sufficient large (for example, selected from a range of 500 nm or greater), so that irregularities caused by the constituent parts on the pixel electrodes are minimized.

Third Embodiment

Figure 6:
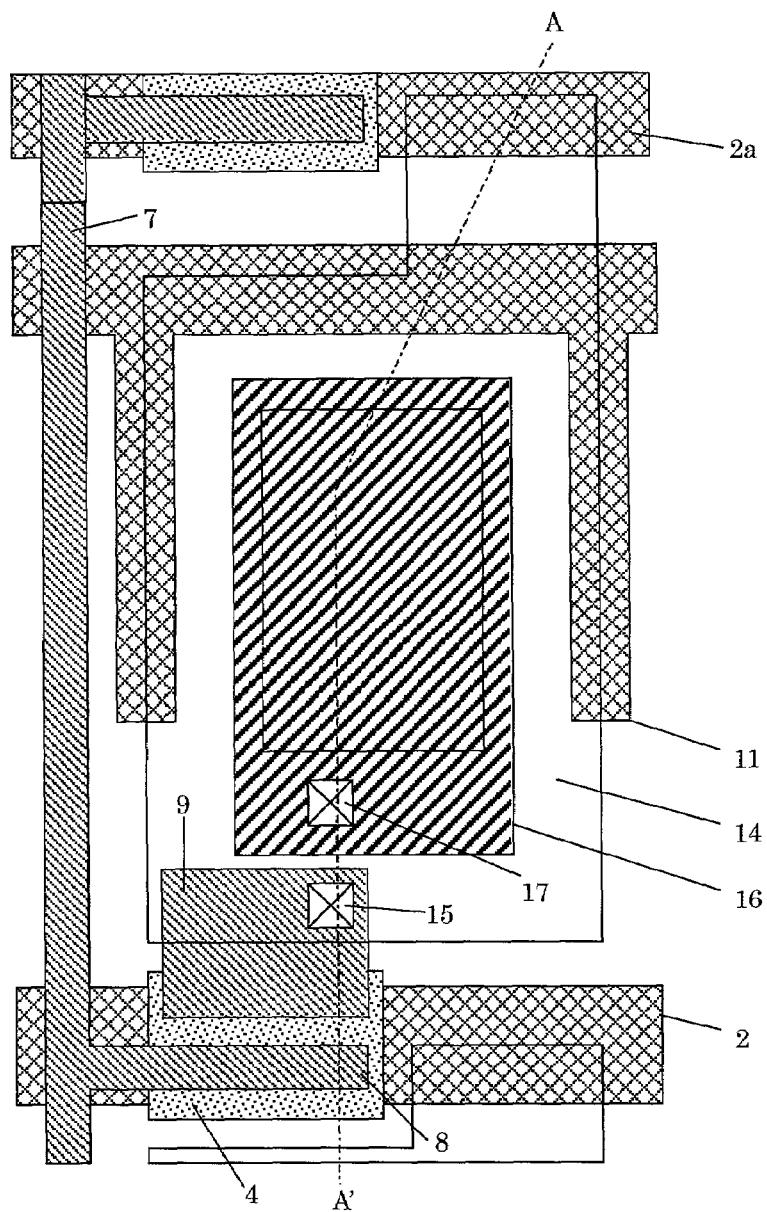
FIG. 6 is a plan view of a pixel in the TFT array substrate.
Figure 7:
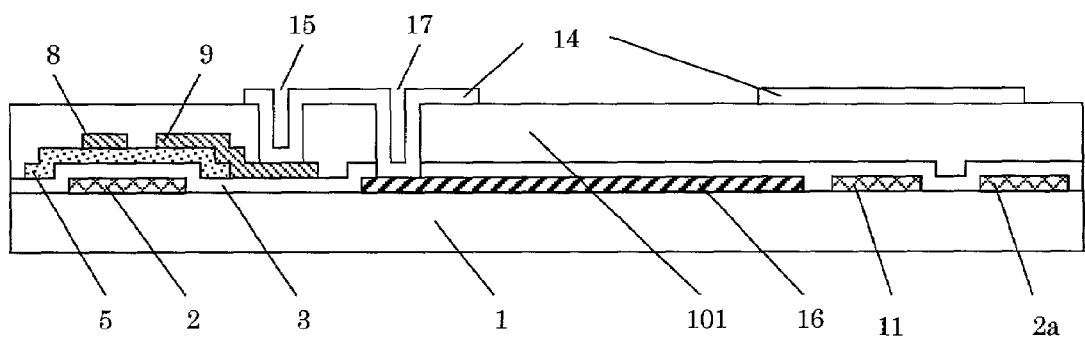
FIG. 7 is a cross sectional view of the pixel in FIG. 6 taken at the line A–A'.

The active matrix-type liquid crystal display device relating to the third embodiment of the present invention is explained using FIGS. 6 and 7. FIG. 6 is a plan view of a pixel in the TFT array substrate; and FIG. 7 is a cross sectional view of the pixel in FIG. 6 taken at the line A–A'. In FIGS. 6 and 7, elements of the constitution having the same symbols as in FIGS. 1 and 2 show identical portions or portions corresponding to the constitution in FIGS. 1 and 2 and an explanation thereof is omitted. In FIGS. 6 and 7, 2a is the adjacent gate line. In this third embodiment, the storage capacitance for stabilizing the pixel potential during the holding period is formed between the pixel electrode 14 and the Cs line 11, and between the pixel electrode 14 and the adjacent preceding gate line 2a.

The method for manufacturing the liquid crystal display device relating to the third embodiment is explained next. The gate lines 2 and 2a are formed by the sputtering and formation of a metal film on the glass substrate 1, and then the patterning with photolithography and etching of this film. The pixel electrode 16, comprising a first layer of ITO, is then formed by the formation with sputtering and patterning of the ITO film. The gate insulating film 3 is then formed. The TFT semiconductor thin film 5 is formed by the formation and patterning of a semiconductor thin film. After that, the source line 7, source electrode 8, and drain electrode 9 are formed by the formation with sputtering and patterning of a metal film. The TFT is formed by the removal of the part of the n-type semiconductor layer and i layer where there is no metal wiring pattern by etching in the pattern formation process.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the ITO. The pixel electrode 14 is then patterned so that part thereof overlaps the preceding gate line 2a, adjacent to the Cs electrode 11, and forms the storage capacitance in this overlapping portion.

Fourth Embodiment

Figure 8:
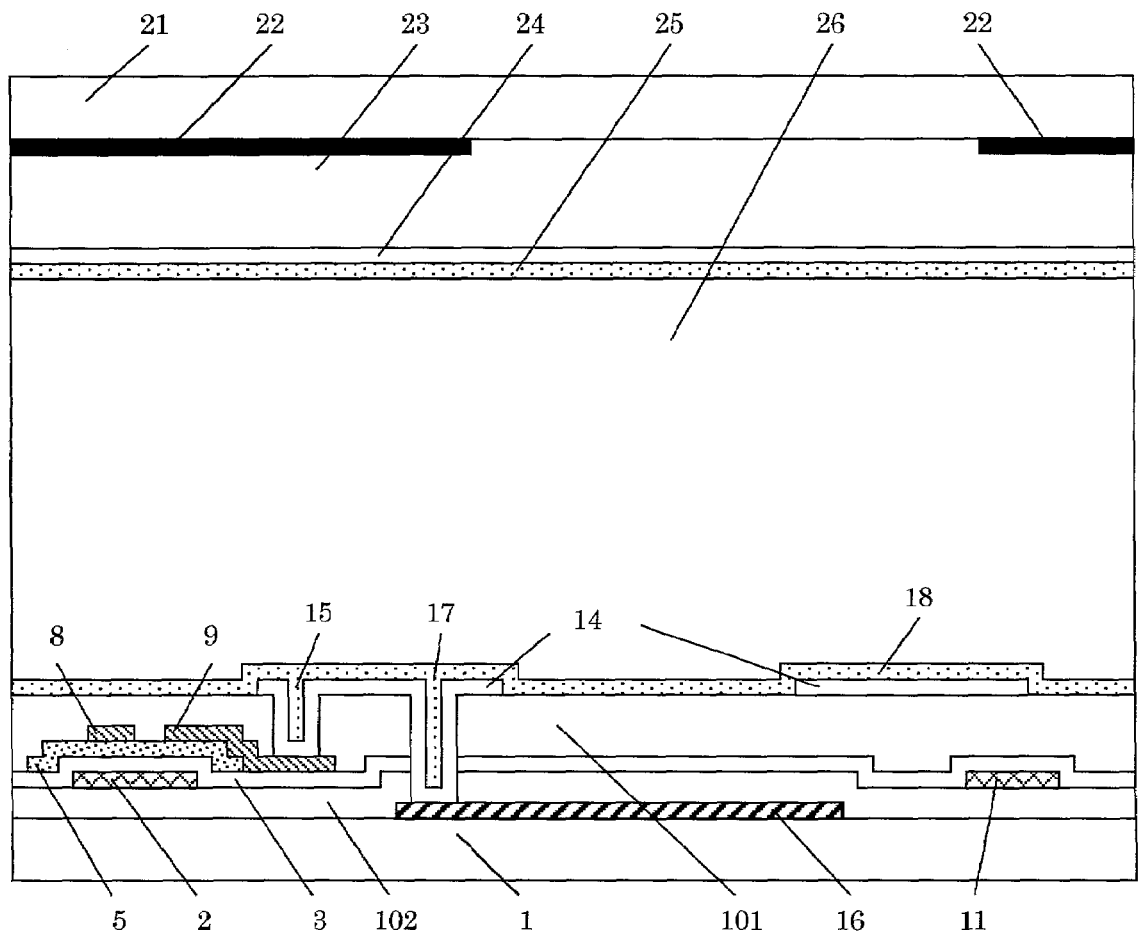
FIG. 8 shows cross sectional view of an active matrix-type liquid crystal display device relating to the fourth embodiment of the present invention.

The active matrix-type liquid crystal display device, relating to the fourth embodiment of the present invention, is explained using the cross sectional view in FIG. 8.

In FIG. 8, elements of the constitution having the same symbols as in FIGS. 1, 2, and 3 show identical portions or portions corresponding to the constitution in FIGS. 1, 2, and 3 and an explanation thereof is omitted. In FIG. 8, 102 is an insulating film. In this fourth embodiment, the insulating film 102 is established in the layer below the gate line 2 and the pixel electrode 16 is established in the layer below the insulating film 102. With a preferred embodiment, the thickness of the insulating film 102 is 200 nm, the thickness of the gate insulating film 3 is 400 nm, and the thickness of the interlayer insulating film 101 is 300 nm.

The method for manufacturing the liquid crystal display device relating to the fourth embodiment is explained next. The pixel electrode 16, comprising a first layer of ITO, is formed by the formation with sputtering and patterning of the ITO film on the glass substrate 1. The gate line 2 and Cs line 11 are then formed with the formation of the insulating film 102, the formation by sputtering of a metal film thereon, and then the patterning by photolithography and etching thereof. The gate insulating film 3 is then formed. The TFT semiconductor thin film 5 is formed by the formation and patterning of a semiconductor thin film. The source electrode 8, and drain electrode 9 are formed by the formation thereon with sputtering and patterning of a metal film. The TFT is formed by the removal of the part of the n-type semiconductor layer and i layer where there is no metal wiring pattern by etching in the pattern formation process.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the ITO.

Fifth Embodiment

Figure 9:
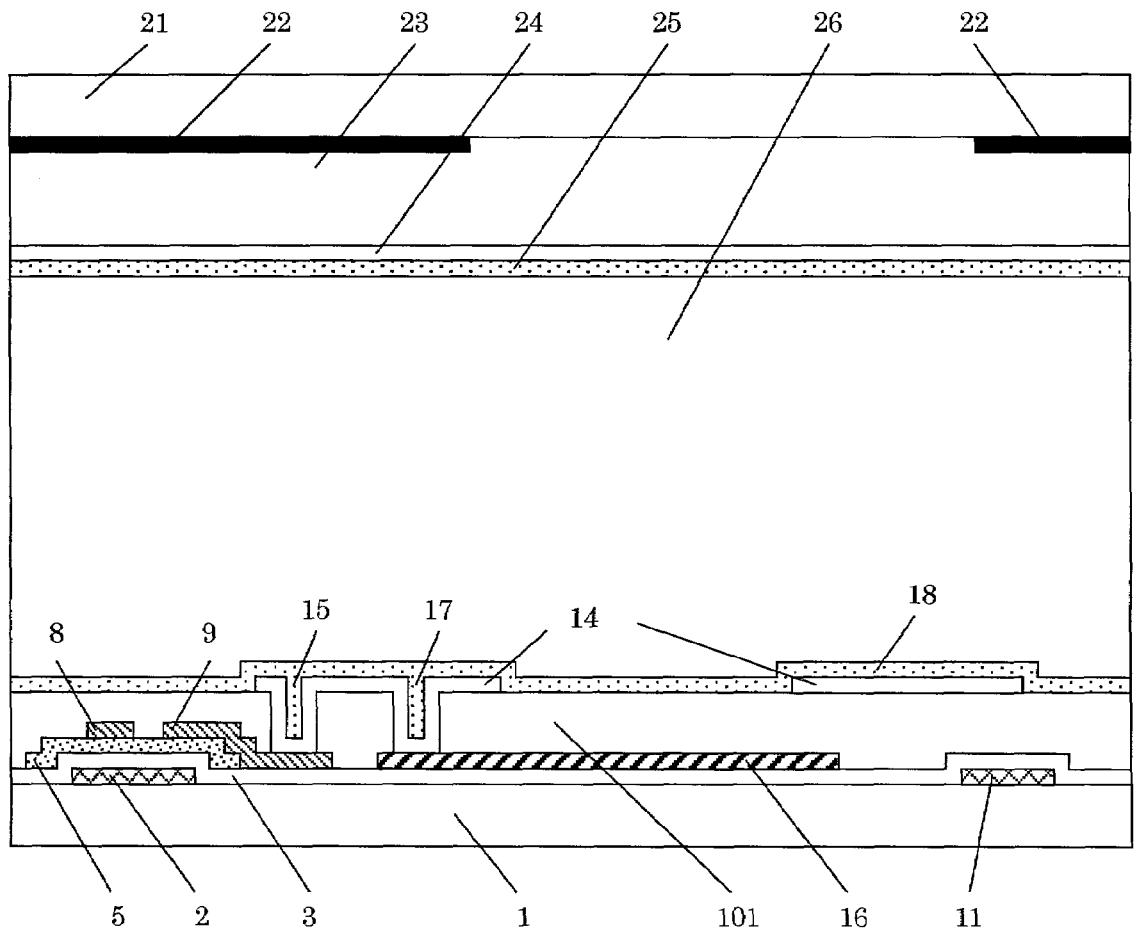
FIG. 9 shows a cross sectional view of an active matrix-type liquid crystal display device relating to the fifth embodiment of the present invention.

The active matrix-type liquid crystal display device, relating to the fifth embodiment of the present invention, is explained using the cross sectional view in FIG. 9.

In FIG. 9, elements of the constitution having the same symbols as in FIGS. 1, 2, and 3 show identical portions or portions corresponding to the constitution in FIGS. 1, 2, and 3 and an explanation thereof is omitted. In this fifth embodiment, in particular, the pixel electrode 16 is established in the same layer as the source electrode 8 and drain electrode 9.

The method for manufacturing the liquid crystal display device relating to the fifth embodiment is explained next. The gate line 2 and Cs line 11 are formed with the formation by sputtering of a metal film on the glass substrate 1, and then the patterning by photolithography and etching thereof. The gate insulating film 3 is then formed. The TFT semiconductor thin film 5 is formed by the formation and patterning of a semiconductor thin film. The pixel electrode 16, comprising a first layer of ITO, is then formed by the formation with sputtering and patterning of the ITO film. The source electrode 8, and drain electrode 9 are formed by the formation thereon with sputtering and patterning of a metal film. The TFT is formed by the removal of the part of the n-type semiconductor layer and i layer where there is no metal wiring pattern by etching in the pattern formation process.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the ITO.

In this example, the contact hole 17 is formed so as to connect the pixel electrode 14 comprising the second layer of ITO with the pixel electrode 16 comprising the first layer of ITO. However, as shown in FIG. 10, the drain electrode 9 and pixel electrode 16 may also be brought into direct contact by forming and patterning the pixel electrode 16, comprising the first layer of ITO, after the formation of the source electrode 8, and extending the pixel electrode 16, comprising the first layer of ITO, to above the drain electrode 9.

Figure 10:
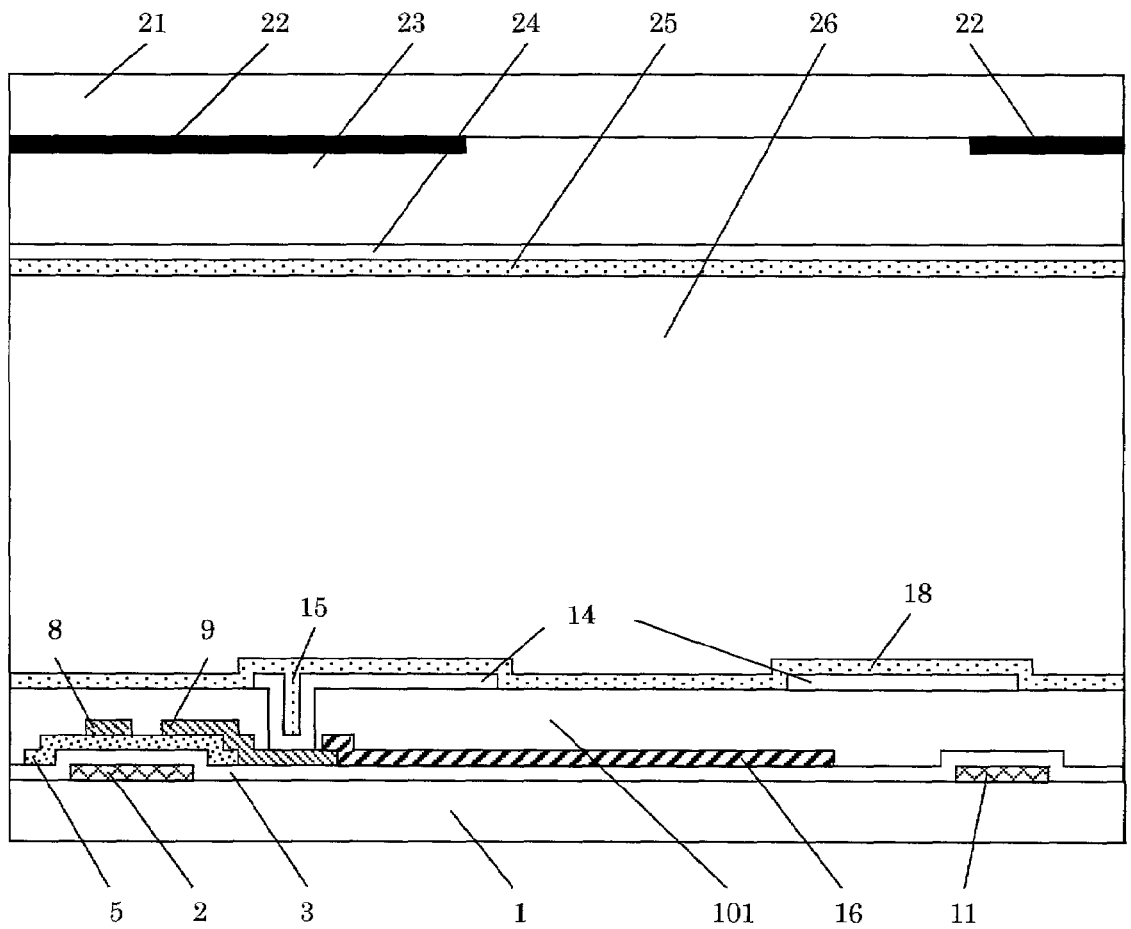
FIG. 10 shows a cross sectional view of an active matrix-type liquid crystal display device relating to the fifth embodiment of the present invention.
Figure 11:
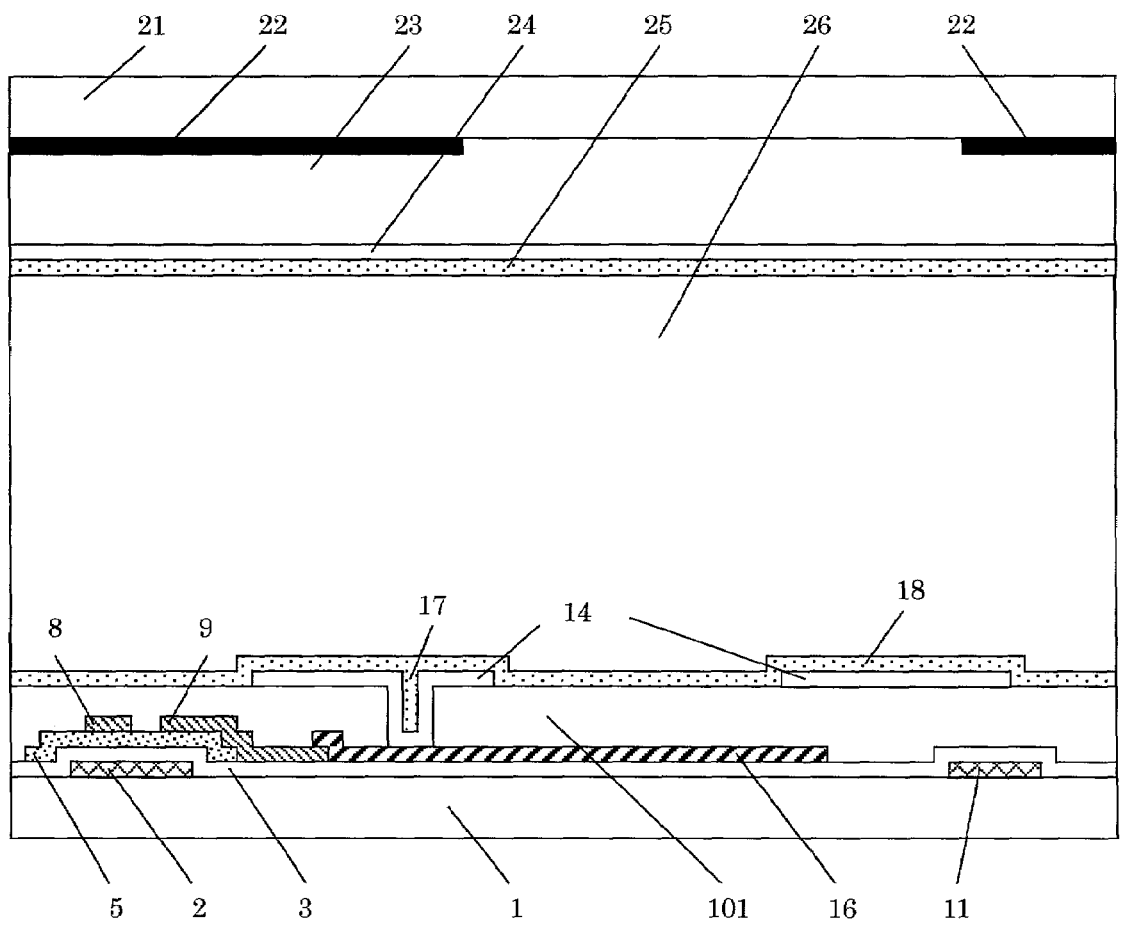
FIG. 11 shows a cross sectional view of an active matrix-type liquid crystal display device relating to the fifth embodiment of the present invention.

At this time, the pixel electrode 14 may also be connected with the drain electrode 9 as shown in FIG. 10, but may be connected with the pixel electrode 16 as well, as shown in FIG. 11. The pixel electrode 14 may of course be constituted so as to connect with both the drain electrode 9 and pixel electrode 16.

Sixth Embodiment

Figure 12:
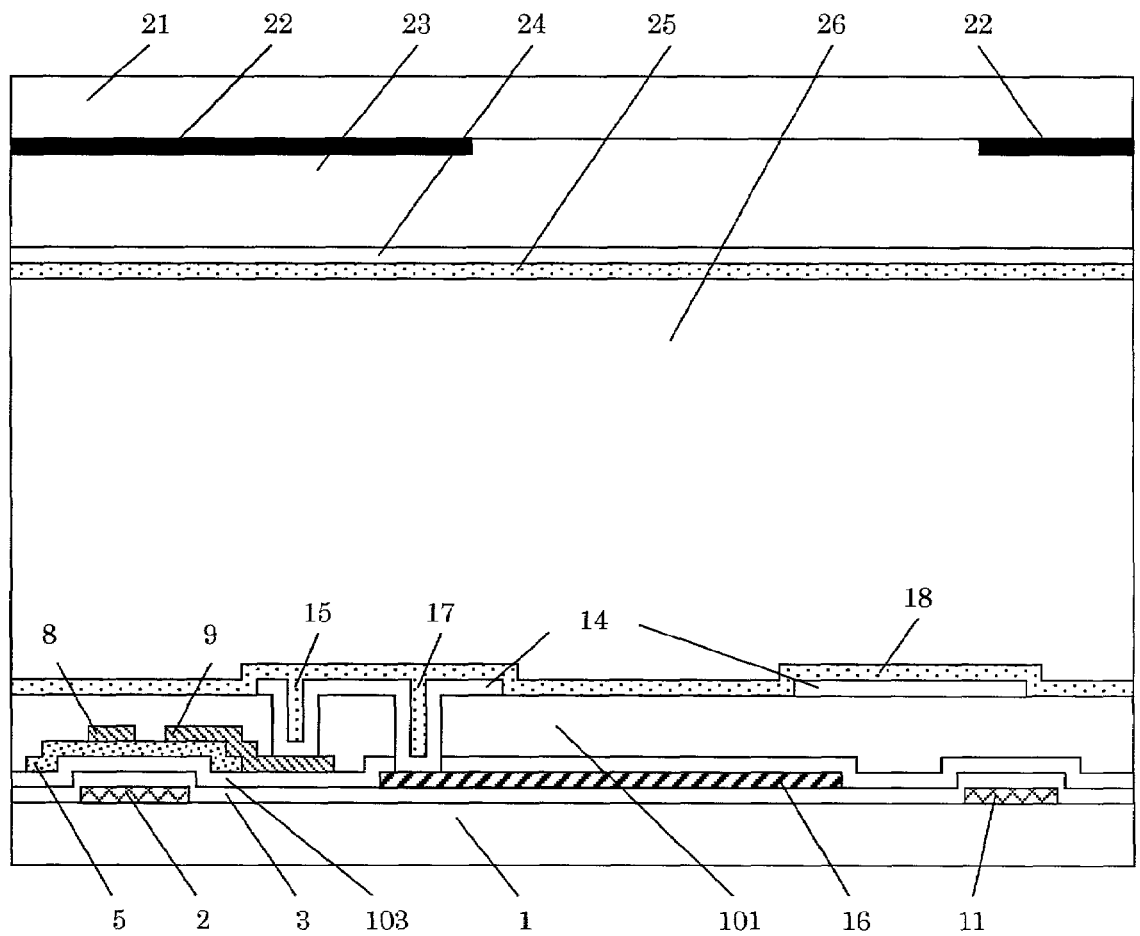
FIG. 12 shows a cross sectional view of an active matrix-type liquid crystal display device relating to the sixth embodiment of the present invention.

The active matrix-type liquid crystal display device, relating to the sixth embodiment of the present invention, is explained using the cross sectional view in FIG. 12.

In FIG. 12, elements of the constitution having the same symbols as in FIGS. 1, 2, and 3 show identical portions or portions corresponding to the constitution in FIGS. 1, 2, and 3 and an explanation thereof is omitted. In this sixth embodiment, in particular, the gate insulating film 3 is disposed in the layer above the gate line 2, and the pixel electrode 16 is established in the layer above the gate insulating film 3. The gate insulating film 103 is then disposed in a layer above the pixel electrode 16 and the interlayer insulating film 101 is disposed in a layer above this gate insulating film 103. Moreover, the pixel electrode 14 is established in the layer above the interlayer insulating film 101.

The method for manufacturing the liquid crystal display device relating to the sixth embodiment is explained next. The gate line 2 and Cs line 11 are formed with the formation by sputtering of a metal film on the glass substrate 1, and then the patterning by photolithography and etching thereof. The first layer of gate insulating film 3 is then formed. After that, the pixel electrode 16, comprising a first layer of ITO, is then formed by the formation with sputtering and patterning of the ITO film. The second layer of gate insulating film 103 is then formed. The TFT semiconductor thin film 5 is formed by the formation and patterning of a semiconductor thin film. The source electrode 8, and drain electrode 9 are formed by the formation thereon with sputtering and patterning of a metal film. The TFT is formed by the removal of the part of the n-type semiconductor layer and i layer where there is no metal wiring pattern by etching in the pattern formation process.

Furthermore, after the formation of the insulating film 101, the contact hole 15 for connecting the pixel electrode 14 and drain electrode 9, and the contact hole 17 for connecting the pixel electrode 14 and pixel electrode 16 are formed. The pixel electrode 14 is then formed by the formation with sputtering and then patterning of the second layer of ITO.

Moreover, in the example discussed above, an example wherein the present invention is applied to a transparent liquid crystal display device using a transparent electrode such as ITO for the pixel electrode is explained. However, the present invention is not limited to this and may also be applied to a reflective liquid crystal display device using an electrode such as aluminum (Al) for the pixel electrode.

Also, in the example discussed above, an example is explained wherein only the alignment layer 18 is disposed in the layer above the pixel electrode 14, but the present invention is not limited to this and an insulating layer may also be established between the pixel electrode 14 and alignment layer 18.

As discussed above, in a liquid crystal display device relating to the present embodiment of the invention, the pixel electrodes have a structure wherein an insulating film is formed in the layer above the first layer transparent electrode, a second layer of transparent electrode is formed in this layer so that part does not overlap the first layer transparent electrode, and the first and second layers of transparent electrode are connected by a contact hole or the like. As a result, it is very easy to set the potential level of the pixel electrode because the first and second layers are connected with the same switching element (TFT) and the same potential level can therefore be supplied thereto.

Also, in a liquid crystal display device relating to the present embodiment of the invention, each of the pixel electrodes has a structure wherein an insulating film is formed in the layer above the first layer transparent electrode, a second layer of transparent electrode is formed in this layer so that part does not overlap the first layer transparent electrode, and the first and second layers of transparent electrode are connected by a contact hole or the like. As a result, it becomes easy to apply electrical fields of different sizes in regions of the same pixel, as the electric field intensities applied to the liquid crystal between this substrate and the opposite substrate. The difference in the transmittances in the V-T characteristics due to the change in viewing angle, in the case where a plurality of regions with different properties is seen as the same pixel, can be made small and the viewing angle range can therefore be expanded. Furthermore, there is no need to create regions where the insulating film remains and where the insulating film is removed on the same pixel electrode as before. It therefore becomes unnecessary to consider the occurrence of problems such as light leakage or the like due to the disorder in the orientation of the liquid crystal because of structural steps present at the boundary from the presence of the insulating film. It becomes possible to increase the thickness of the insulating film and the viewing angle range can be greatly expanded.

Figure 13:
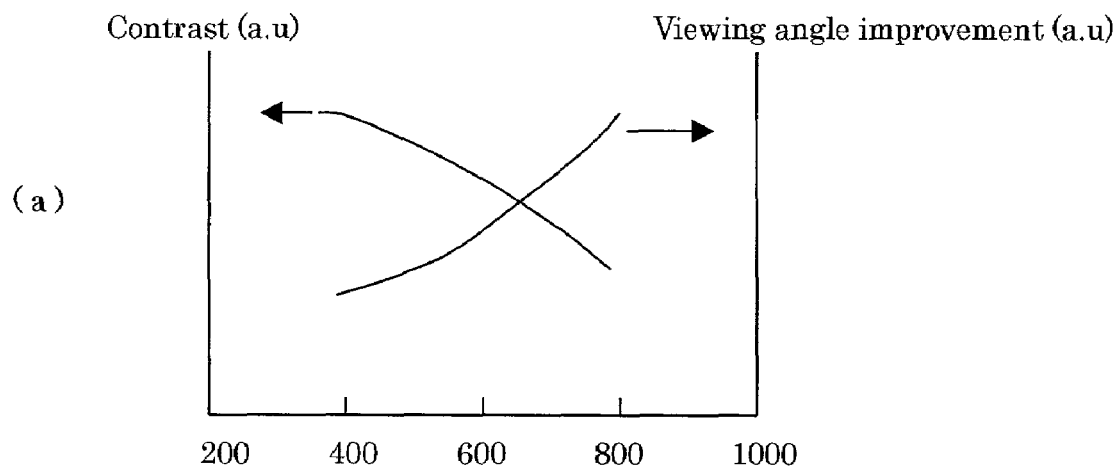
FIG. 13 shows a relationship among the viewing angle, contrast and thickness of insulating film established between the first layer and the second layer of pixel electrode.
Figure 13:
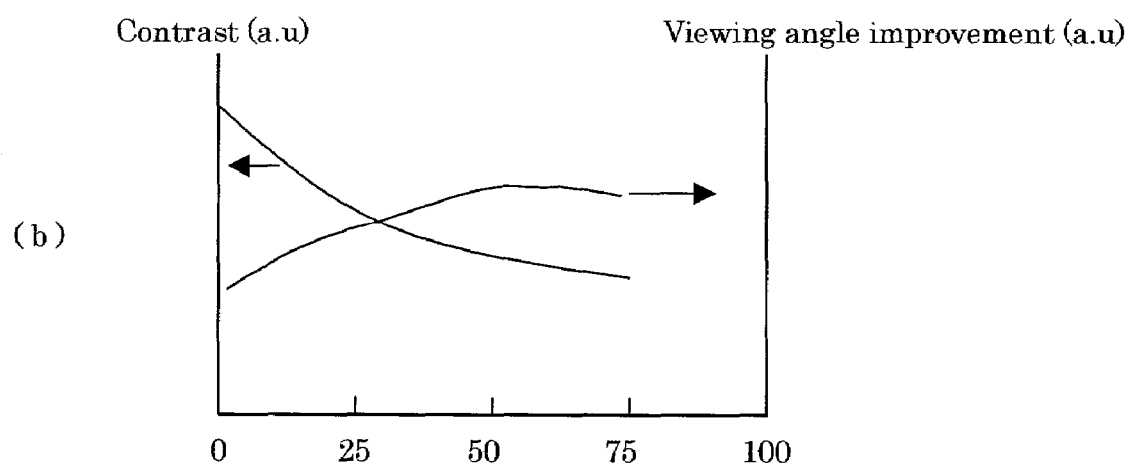

Specifically, as shown in FIG. 13(*a*), the viewing angle improvement effects are mostly not achieved when the thickness of the insulating film established between the first layer of pixel electrode and second layer of pixel electrode is about 400 nm. This thickness must be at least 500 nm to 600 nm and sufficient viewing angle improvement effects can be attained when this thickness is greater than about 800 nm. In FIG. 13(*a*), the improved viewing angle means the improved angle relative to the gray-scale inversion. The thickness of the insulating film established between the first layer pixel electrode and the second layer pixel electrode changes with the relationships between the anisotropy of the dielectric constant of the liquid crystal normally used in the TN mode and the dielectric constant of the insulating film material, as well as the thickness and dielectric constant of the insulating film disposed on the second pixel electrode. However, this thickness can also be expressed as the ratio of the voltage applied to the liquid crystal layer between the transparent electrode 24 opposite to the first pixel electrode and separated from the liquid crystal, and the transparent electrode 24 opposite to the second pixel electrode and separated from the liquid crystal. The 400 nm in FIG. 13(*a*) corresponds to a 0.9:1.0 voltage ratio and it is preferable that the abovementioned voltage ratio be greater than this. Also, in terms of the driving voltage, power consumption, cost of the driving circuit, and so forth, the upper limit to the abovementioned voltage ratio is preferably 0.5:1.0.

In order to widen the viewing angle, it is necessary to apply electrical fields of different sizes depending on the region in the same pixel as the electrical field intensity applied to the liquid crystal between the opposite electrodes. It is also necessary to consider at what percentage the region of liquid crystal, substantially controlled by the first layer pixel electrode and opposite electrode, constitutes each of the pixels. This ratio can be calculated as the ratio between the area of the region without the second layer pixel electrode but with the first layer pixel electrode in the region specified as the opening portion of the pixel, to the area of the region specified as the opening portion of the pixel. In order to stabilize the viewing angle improvement effects as shown in FIG. 13(*b*), an area of several percent or greater at the least is necessary. When this ratio is made larger, however, contrast has a tendency to decrease and it is therefore necessary to select the optimal ratio for the display characteristics with consideration of the viewing angle improvement effects and the decrease in contrast. This ratio can be selected from a range of several to several tens in percentage, but is preferably in the range of several to 75% in order to attain good viewing angle improvement effects and desirable contrast.

Also, in the active matrix-type liquid crystal display device relating to this embodiment of the present invention, the individual pixel electrodes have a constitution wherein an insulating film is formed in the layer above the first layer transparent electrode, a second layer transparent electrode is formed on this layer so that part of the region does not overlap the first layer transparent electrode, and the first and second layer transparent electrodes are connected with a contact hole or the like. Because of this, there is no need to create regions where the insulating film remains and where the insulating film is removed on the same pixel electrode as before. Even in the case where the electrical field intensities applied to the liquid crystal vary greatly depending on the region of the pixel, the thickness of the insulating film present between the first layer and second layer can be made greater. In this case as well, there is no light leakage or the like due to the disorder in the orientation of the liquid crystal because of structural steps present at the boundary from the presence of the insulating film. Because the brightness of black display state can be made small, it becomes possible to realize a liquid crystal display device having a high contrast display function.

Seventh Embodiment

Figure 14:
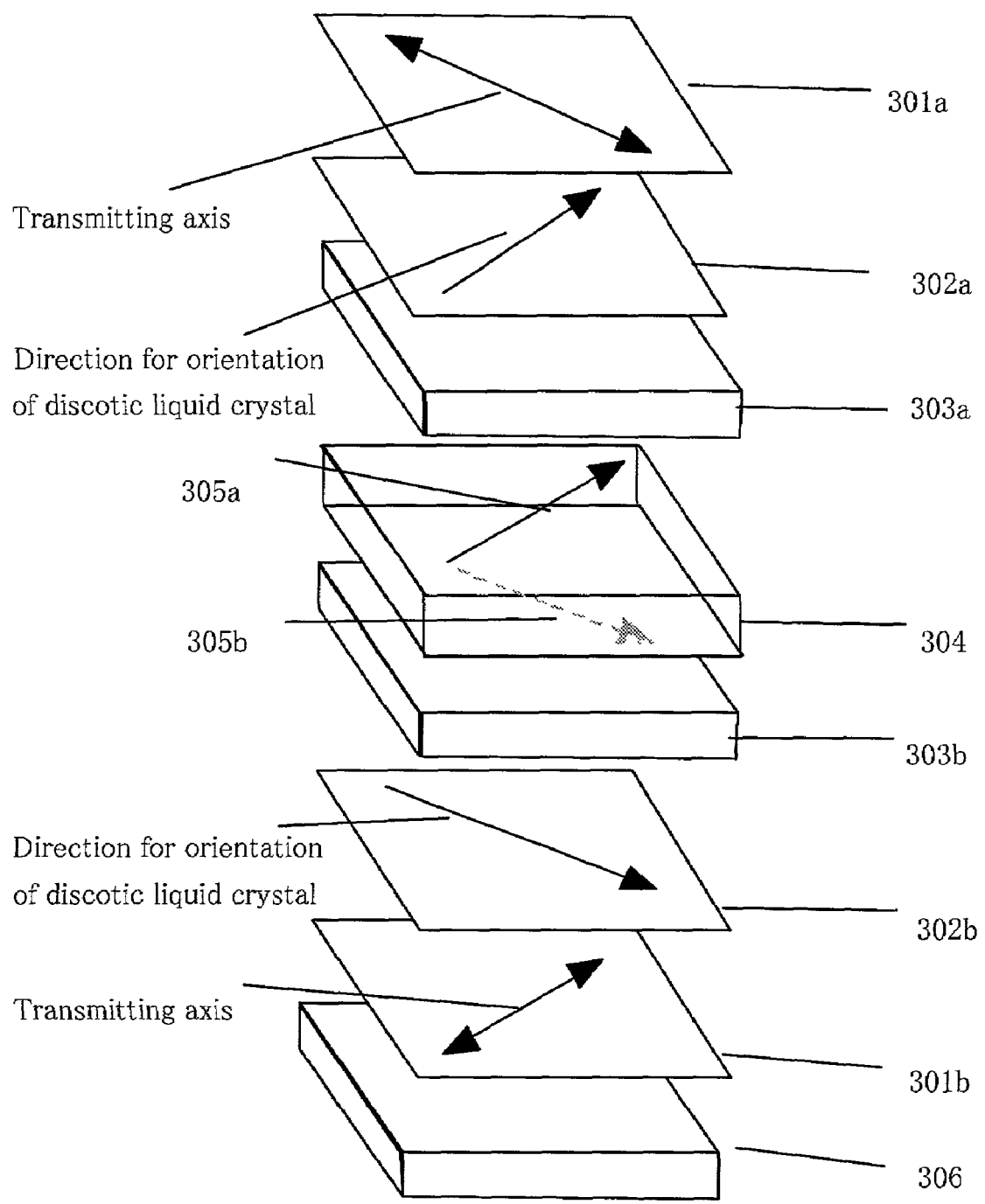
FIG. 14 shows the constitution of the liquid crystal display device relating to the seventh embodiment.

FIG. 14 shows the constitution of the liquid crystal display device relating to the seventh embodiment. In this drawing, 301a and 301b are polarizing plates, 302a and 302b are optical compensating films having stabilized the orientation state of discotic liquid crystal, 303a and 303b are substrates, 304 is liquid crystal, 305a and 305b are the rubbing directions for the upper and lower substrates, and 306 is the backlight. The driving circuit for driving the active matrix is not shown.

Figure 24:
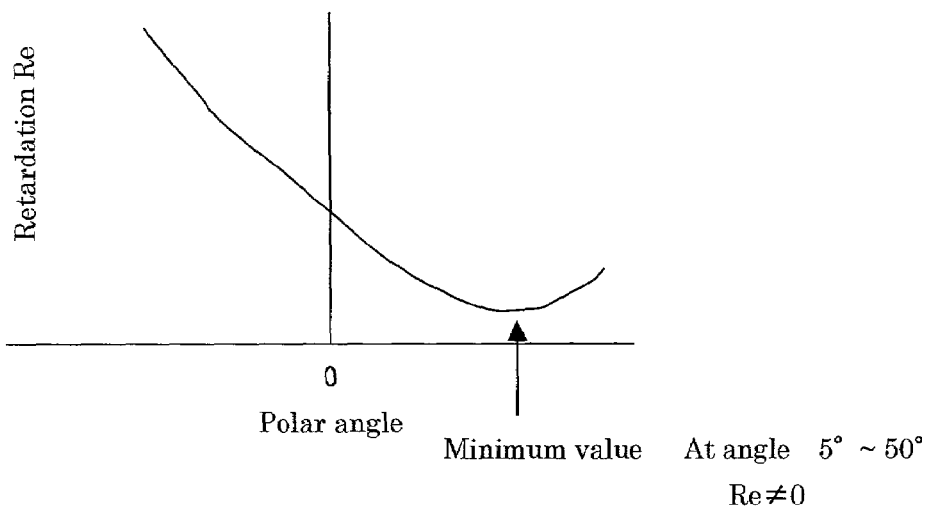
FIG. 24 shows a relationship between the retardation and polar angle.
Figure 25:
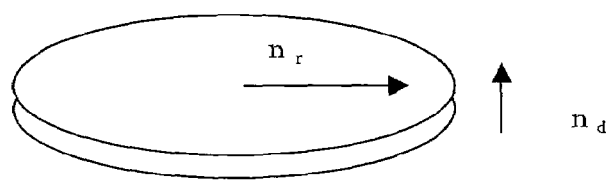
FIG. 25 is an explanatory diagram for index of refraction of discotic liquid crystal.
Figure 26:
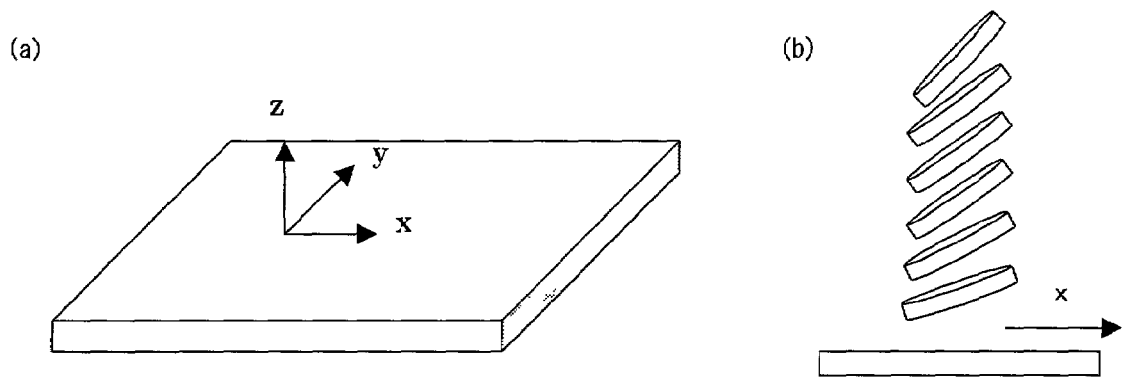
FIG. 26 is an explanatory diagram for index of refraction of discotic liquid crystal.

Here, the optical compensating films 302a and 302b are optical compensating films wherein the orientation state of the discotic liquid crystal is stabilized. The actual constitution of this optical compensating film is disclosed in Japanese Patent Laid-open Publication Nos. H08-50204, H08-50270, H08-95030, H08-95034, and H09-5524, for example. These optical compensating films 302a and 302b are thought to provide a hybrid orientation to the discotic liquid crystal, wherein the director angle changes continuously in the depthwise direction. For this reason, the absolute value of retardation has a minimum value that is not 0 in any direction and the direction where minimum retardation value shown is inclined at 5° to 50° from the normal to the optical compensating films (see FIG. 24). The anisotropy of the index of refraction is negative for the discotic liquid crystal. In other words, as modeled in FIG. 25, the index of refraction $n_r$ in the radial direction and the index of refraction $n_d$ in the depthwise direction of a disk-shaped compound have a relationship where $n_r > n_d$. For this reason, as the entire optical compensating film, when x is the direction of the inclination of the discotic compound as shown in FIG. 26(b) and the indices of refraction in the x, y, z directions shown in FIG. 26(a) are nx, ny, and nz respectively, the index of refraction nx and ny in the surface and the index of refraction nz in the depthwise direction have a relationship wherein nx>ny>nz. The direction in which this director inclined direction is projected onto the film surface is shown by the arrows on the optical compensating films 302a and 302b in FIG. 14. It could be verified that it is desirable for the product of the birefringence $\Delta n$ of the liquid crystal 304 and the thickness d of the liquid crystal layer to satisfy the relationship of $0.30 \, \mu m \leq \Delta n \cdot d \leq 0.50 \, \mu m$. It could be verified that $0.34 \, \mu m \leq \Delta n \cdot d \leq 0.42 \, \mu m$ was more preferable.

Figure 18:
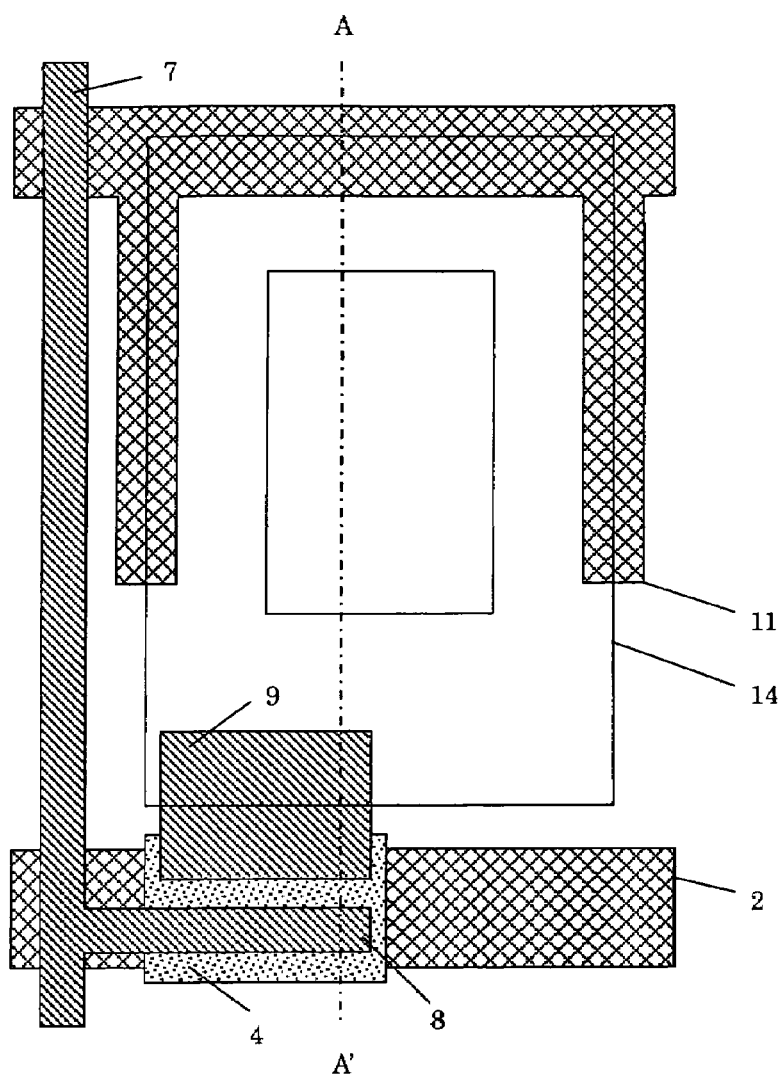
FIG. 18 shows the pixel layout in a conventional TFT array substrate.
Figure 19:
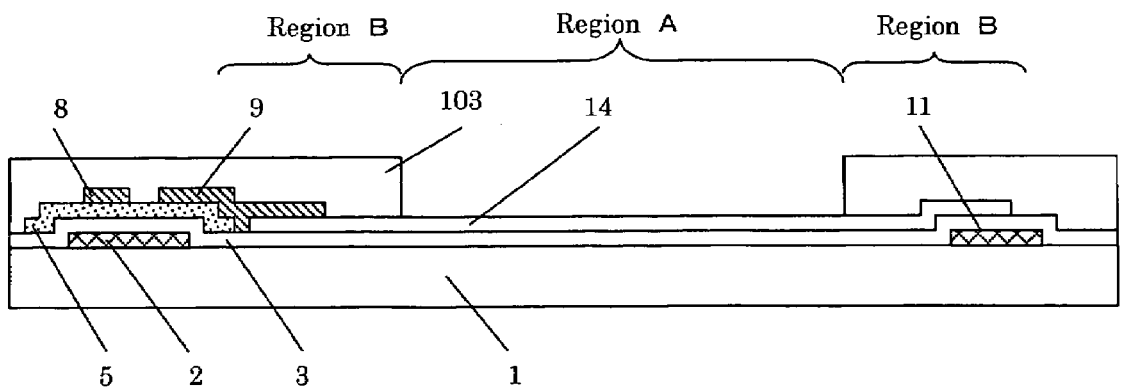
FIG. 19 shows a cross sectional view of the pixel in FIG. 18 at the line A–A'.
Figure 20:
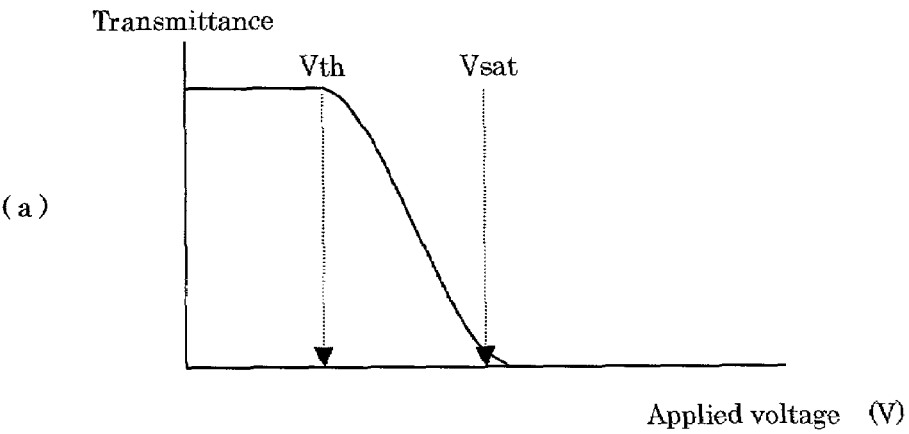
FIG. 20 shows the relationship (V-T characteristics) of the voltage applied to the liquid crystal and the transmittance in the normally white (black display on a white background) mode for a TN-type liquid crystal display element.
Figure 20:
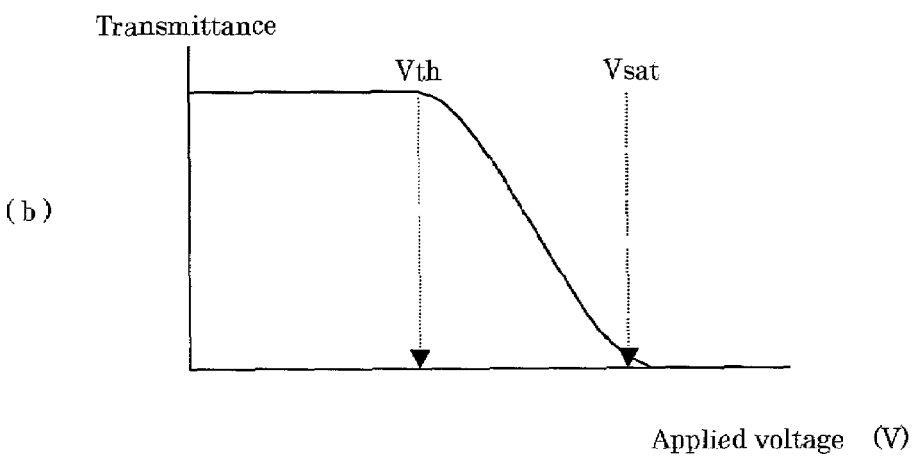
Figure 20:
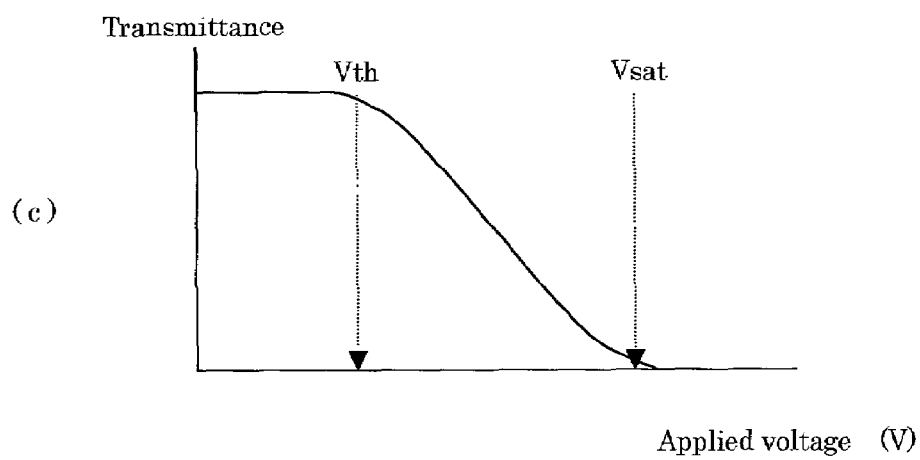
Figure 21:
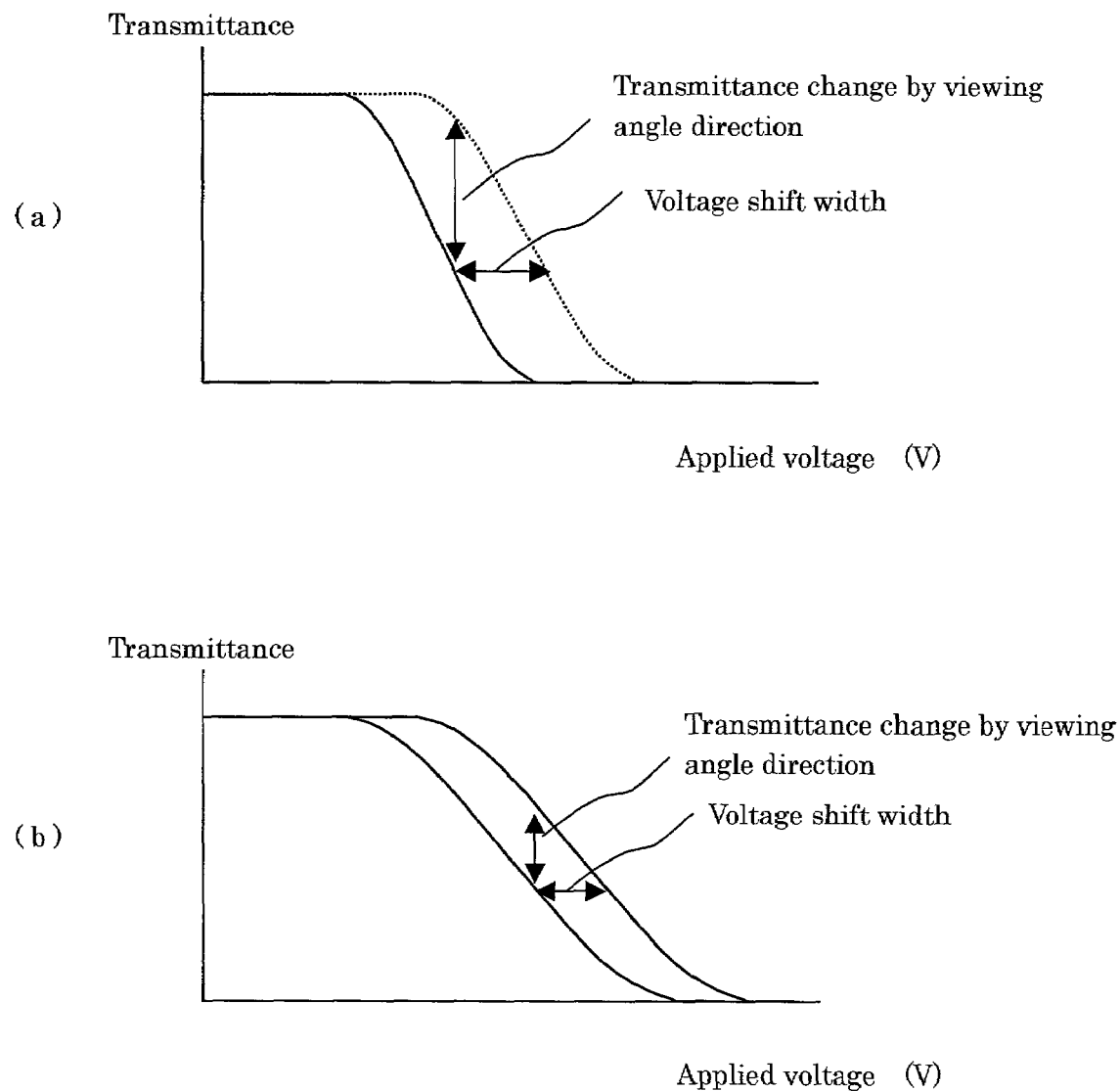
FIG. 21 shows a situation of the change of the V-T characteristics due to the viewing angle direction.

Moreover, the actual constitution of the liquid crystal display elements to be applied in the liquid crystal display device relating to the seventh embodiment need not be constituted as explained in the first through sixth embodiments and may also have a structure where different voltages can be applied to the same pixel. For example, [the structure] can also be applied to the conventional structure shown in FIGS. 18 and 19, specifically, to a structure wherein an insulating film is prepared on the pixel electrode, and part of the insulating film is removed from the pixel electrode. Furthermore, by applying potential to the lower pixel electrode and forming a capacitor between the upper and lower pixel electrodes without connecting the two layers of pixel electrode together, different voltages can be applied to the same pixel because the potential of the upper pixel electrode is controlled by coupling. This structure was disclosed in, for example, "Active-matrix LCDs using gray-scale in halftone methods" (Kalluri R. Sarma et al., Phoenix Technology Center, Honeywell, Inc. Phoenix, Ariz., SID 89 Digest P148 to P150).

The method for manufacturing the liquid crystal display device relating to the seventh embodiment is explained next. First, alignment layer is applied to the substrate 303b whereon the pixel electrodes are disposed a matrix form and the substrate 303a forming the opposite electrode (not shown); and this undergoes heat treatment for 30 minutes at 200° C. Next, the rubbing process is performed so that the orientation of the liquid crystal is approximately 90° to the alignment layer. The orientation of the liquid crystal becomes about 90° when the twisting angle of the liquid crystal layer held between the upper and lower substrates is in a range of 70° to 100°. If the twisting angle of the liquid crystal layer is within the abovementioned range, good voltage to transmittance response is attained for the normally white mode. Also, the pretilt angle of the liquid crystal is preferably 3° to 9°. When the pretilt angle is less than 3°, regions of undesired orientation occur easily in the effective display portion of the pixels and this brings about a deterioration in the display quality. On the other hand, if 9° or greater, the transmittance in the white display state decreases and this results in a drop in the display brightness. Next, a spacer comprising plastic beads is applied to one of the substrate so that the thickness of the liquid crystal layer becomes 4.3 μm and the two substrates 303a and 303b are laid over each other. At this time, the substrates are surrounded with a sealing material except for part of the circumference and the liquid crystal 304 is injected with a vacuum injection method. The injected liquid crystal 304 is a liquid crystal having a birefringence $\Delta n=0.089$. Next, polarizing plates 301a and 301b (from Sanritsu Co.), whereon are applied the optical compensating films 302a and 302b, are applied to each of the substrates 303a and 303b, so that the rubbing direction and the direction of the inclination of the discotic liquid crystal match as shown in FIG. 14. The absorption axes of the polarizing plates are about 90° between 301a and 301b. Furthermore, the driving circuit is installed, the device is combined with the backlight, and the normally white mode liquid crystal display device is prepared.

Figure 15:
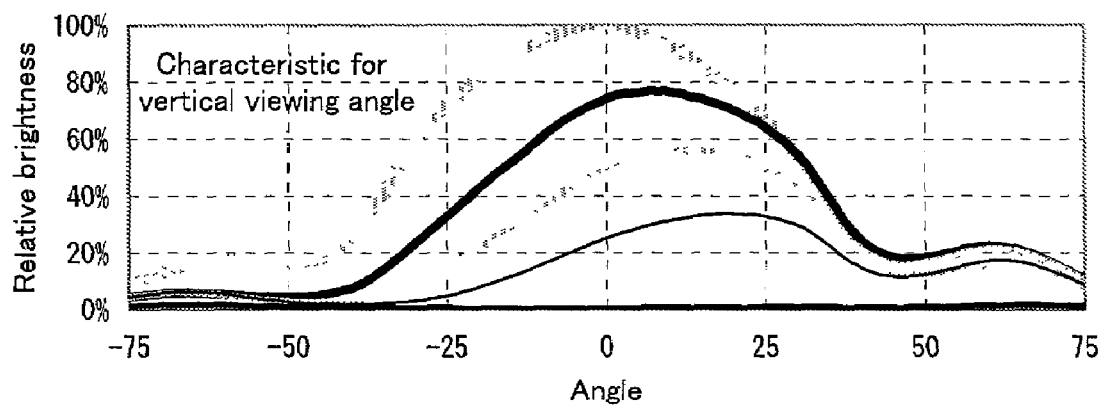
FIG. 15 shows a relationship between the vertical relative transmittance and angle.
Figure 22:
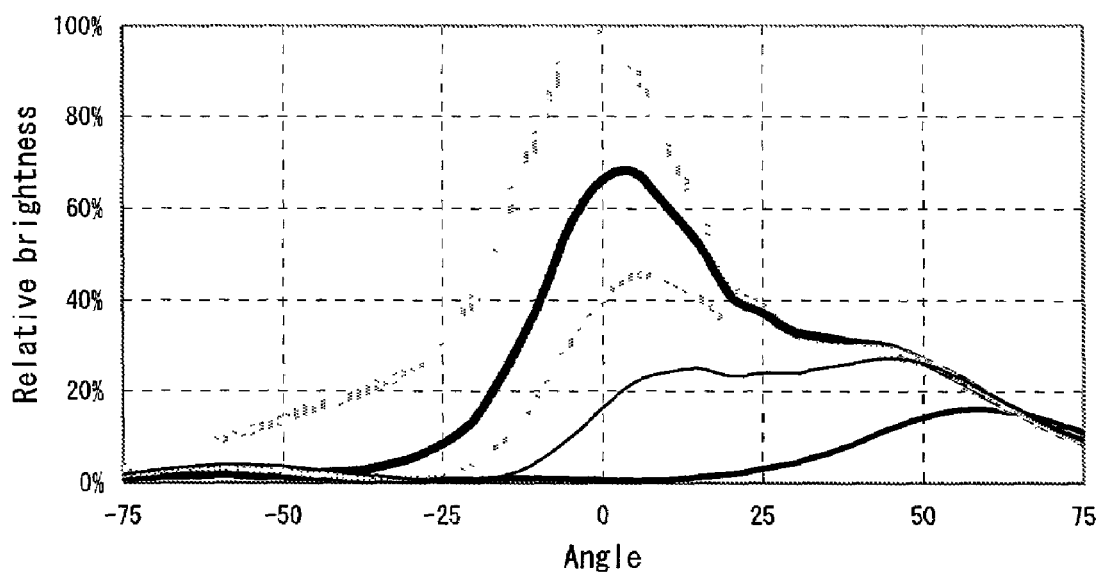
FIG. 22 shows a relationship between the vertical relative transmittance and angle.

FIG. 15 shows the relationship between the vertical relative transmittance and angle when voltage is applied so that the relative transmittance becomes 100%, 75%, 50%, 25%, and black display at normal to the panel surface of the liquid crystal display device relating to the present embodiment. As shown in the drawing, the downward half tone gray-scale inversion does not cross by about −50° and inversion does not occur until this angle.

Figure 16:
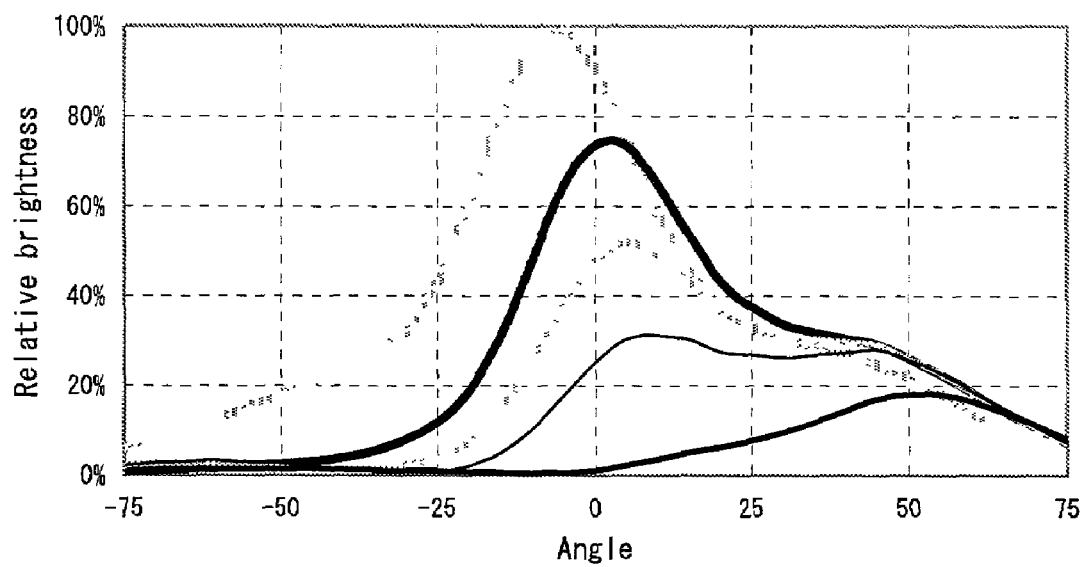
FIG. 16 shows a relationship between the vertical relative transmittance and angle.

The angle at which the gray-scale inversion occurs is clearly widened downwards in comparison to the about −25° in the case of applying the structure wherein different voltages are applied to the same pixel in the TN mode and the optical compensating films are not applied, shown in FIG. 16.

Figure 23:
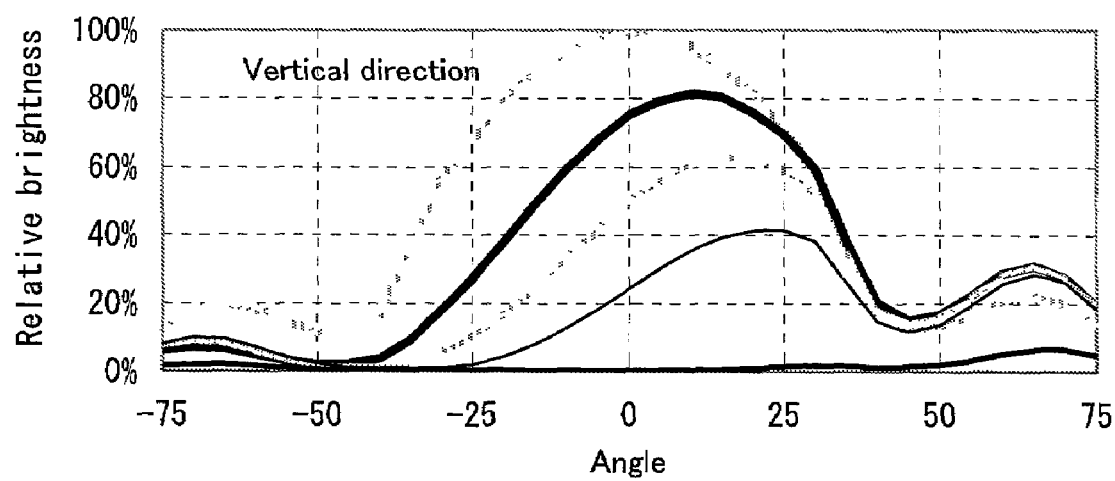
FIG. 23 shows a relationship between the vertical relative transmittance and angle.
Figure 17:
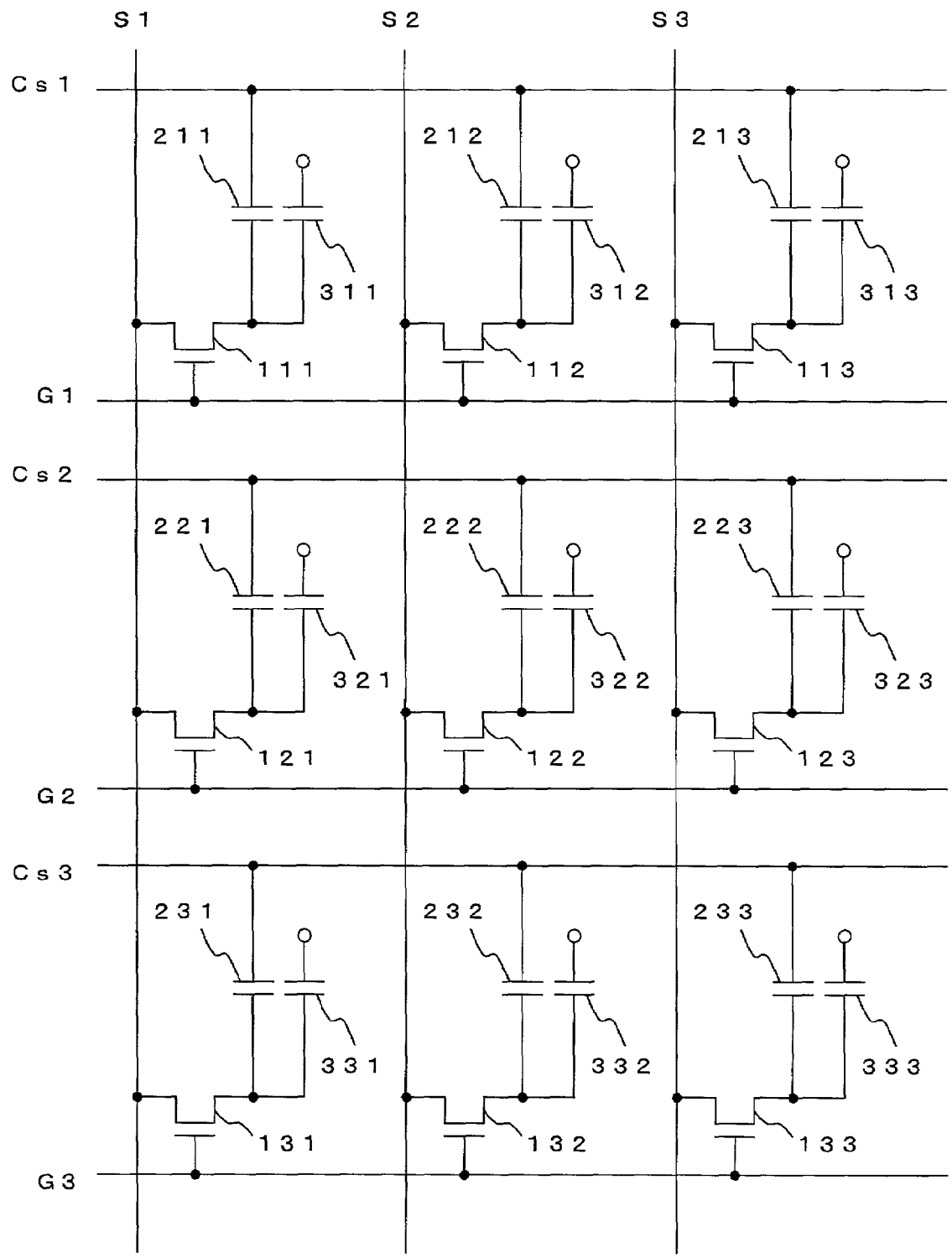
FIG. 17 shows an equivalent circuit for a TFT array substrate.

Also, the angle at which the gray-scale inversion occurs is clearly widened downwards in comparison to the about −45° in the measured results for the conventional liquid crystal display device in the TN mode shown in FIG. 23, with the optical compensating films, for fixing the orientation of the discotic liquid crystal, inserted between the upper and lower substrates and the polarizing plates.

The reason why these results were attained is determined as follows. Optical compensation is carried out by combining the liquid crystal layer with the optical compensation film. However, in the case where the liquid crystal display panel in the state of displaying black or half tones gray is viewed from an angle, there is retardation for which optical compensation is not possible depending on this combination. However, by employing a structure wherein two or more voltages are applied in one pixel, there is an additional effect wherein the inclination of the gray-level-brightness characteristics is reduced and the angle at which gray-scale inversion occurs can be widened downwards.

Any liquid crystal material that is one the market for active matrix applications can be used for the liquid crystal used in the present invention. The viewing angle improvement effects are mostly not attained when the thickness of the insulating film established between the first layer pixel electrode and second layer pixel electrode, in the case where the invention according to the seventh embodiment is applied to the liquid crystal display device according to the first and sixth embodiments, is about 400 nm as shown in FIG. 13(a). [This thickness] must be 500 nm to 600 nm or more at the least and sufficient viewing angle range improvement effects can be attained when about 800 nm or greater.

With the present invention, the method for improving the viewing angle range does not need to be a step structure, due to the presence of insulating films or the like as before, to vary the electrical field strength applied to the liquid crystal depending on the region in each of the pixels. It is therefore possible to eliminate light leakage due to the disorder in the orientation of the liquid crystal at step portions or near the base of step portions, and to realize a liquid crystal display device with a wide viewing angle range, low black brightness, and high contrast.

While preferred embodiments of the present invention have been described using specific terms, such description is for illustrative purposes only, and it is to be understood that changes and variations may be made without departing from the spirit or scope of the following claims.

What is claimed is:

1. A liquid crystal display device comprising:
    transistors disposed at the intersections of gate lines and source lines;
    pixel electrodes connected with the transistors;
    opposite electrodes opposite to these pixel electrodes; and
    liquid crystal held between said opposite electrodes and said pixel electrodes,
    wherein said pixel electrodes comprise a first pixel electrode and a second pixel electrode disposed in a layer above an insulating film which is itself disposed in a layer above the first pixel electrode, and having a region that does not overlap with the first pixel electrode, and
    wherein the first pixel electrode and second pixel electrode are electrically connected, the first pixel electrode applying a first electric field to the liquid crystal, and the second pixel electrode applying a second electric field whose strength is different from the first electric field to the liquid crystal, and
    wherein a ratio of a first voltage applied to the liquid crystal by the first pixel electrode and a second voltage applied to the liquid crystal by the second pixel electrode is 0.5:1.0 to 0.9:1.0.

2. The liquid crystal display device, according to claim 1, wherein the cumulative capacitance for stabilizing the pixel potential during the holding period is formed between said second pixel electrode and a storage capacitance electrode line or between the second pixel electrode and the preceding gate line adjacent thereto.

3. The liquid crystal display device, according to claim 1, wherein said first pixel electrode is disposed in the same layer as the gate line.

4. The liquid crystal display device, according to claim 1, wherein an insulating film is disposed in the layer below said gate line, and said first pixel electrode is disposed in the layer below said insulating film.

5. The active matrix liquid crystal display device, according to claim 1,
    wherein a first gate insulating film is disposed in the layer above said gate line, said first pixel electrode is disposed in the layer above the first gate insulating film, a second gate insulating film is disposed in the layer above the first pixel electrode, an interlayer insulating film is disposed in the layer above the second gate insulating film, and said second pixel electrode is disposed in the layer above the interlayer insulating film.

6. The liquid crystal display device, according to claim 1, wherein said first pixel electrode is disposed in the same layer as the drain lines of said transistors.

7. The liquid crystal display device, according to claim 6, wherein said first pixel electrode is directly connected to the drain electrode of said transistors.

8. The liquid crystal display device, according to claim 1, wherein said second pixel electrode comprises an opening in the central portion of said second pixel electrode, and said insulating film and said liquid crystal are held between said first pixel electrode and opposite electrode in that opening.

9. A liquid crystal display device comprising:
    transistors disposed at the intersections of gate lines and source lines;
    pixel electrodes connected with the drain electrodes of the transistors;
    opposite electrodes opposite to these pixel electrodes; and
    liquid crystal held between said opposite electrodes and said pixel electrodes,
    wherein said pixel electrodes comprise a first pixel electrode and a second pixel electrode disposed in a layer above an insulating layer which is itself disposed in a layer above the first pixel electrode, and having a region that does not overlap with the first pixel electrode, and
    wherein the first pixel electrode and second pixel electrode are electrically connected with said drain electrode, the first pixel electrode applying first electric field to the liquid crystal, and the second pixel electrode applying a second electric field whose strength is different from the first electric field to the liquid crystal, and
    wherein a ratio of a first voltage applied to the liquid crystal by the first pixel electrode and a second voltage applied to the liquid crystal by the second pixel electrode is 0.5:1.0 to 0.9:1.0.

10. The liquid crystal display device, according to claim 1 or 9, wherein the thickness of said insulating layer is 500 nm or greater.

11. The liquid crystal display device, according to claim 1 or 9, wherein said pixel electrode is a transparent electrode.

12. A method for manufacturing a liquid crystal display device having transistors disposed at the intersections of gate lines and source lines, pixel electrodes connected with the transistors, opposite electrodes opposite to these pixel electrodes, and liquid crystal held between said opposite electrodes and said pixel electrodes, wherein said method comprises:
    a step for manufacturing a first pixel electrode applying a first electric field to the liquid crystal;
    a step for manufacturing an insulating layer in a layer above the first pixel electrode;
    a step for manufacturing a second pixel electrode in a layer further above the insulating layer, said second pixel electrode having a region that does not overlap the first pixel electrode, and being electrically connected with the first pixel electrode and applying a second electric field whose strength is different from the first electric field to the liquid crystal, wherein a ratio of the voltages applied to said liquid crystal by said first pixel electrode and said second pixel electrode is 0.5:1.0 to 0.9:1.0.

13. A method for manufacturing a liquid crystal display device having transistors disposed at the intersections of gate lines and source lines, pixel electrodes connected with the drain electrodes of the transistors, opposite electrodes opposite to these pixel electrodes, and liquid crystal held between said opposite electrodes and said pixel electrodes, wherein said method comprises:

a step for manufacturing a first pixel electrode electrically connected with said drain electrode and applying a first electric field to the liquid crystal;

a step for manufacturing an insulating layer in a layer above the first pixel electrode; and a step for manufacturing a second pixel electrode in a layer further above the insulating layer, said second pixel electrode having a region that does not overlap the first pixel electrode, and being electrically connected with said drain electrode and applying a second electric field whose strength is different from the first electric field applied to the liquid crystal, wherein a ratio of the voltages applied to said liquid crystal by said first pixel electrode and said second pixel electrode is 0.5:1.0 to 0.9:1.0.

14. The liquid crystal display device according to claim 1, wherein the cumulative capacitance for stabilizing the pixel potential during the holding period is formed between said second pixel electrode and a storage capacitance electrode line, and between the second pixel electrode and the preceding gate line adjacent thereto.

* * * * *